United States Patent [19]
Morizaki et al.

[11] Patent Number: 6,163,100
[45] Date of Patent: Dec. 19, 2000

[54] DRIVING CIRCUIT OF ULTRASONIC MOTOR

[75] Inventors: Satoshi Morizaki, Hoi-gun; Hiroyuki Furukoshi; Masao Nakada, both of Toyohashi; Kazutomo Kakegawa, Inasa-gun, all of Japan

[73] Assignee: ASMO Co., Ltd., Japan

[21] Appl. No.: 09/216,945

[22] Filed: Dec. 21, 1998

[30] Foreign Application Priority Data

Dec. 26, 1997 [JP] Japan ........................... 9-358914
Dec. 26, 1997 [JP] Japan ........................... 9-358940

[51] Int. Cl.$^7$ ........................................ H02N 2/00
[52] U.S. Cl. ........................................ 310/317
[58] Field of Search ........................... 310/317, 318

[56] References Cited

U.S. PATENT DOCUMENTS 4,954,741  9/1990  Furutsu et al. .................. 310/317
5,508,579  4/1996  Suganuma ....................... 310/316

FOREIGN PATENT DOCUMENTS 1-179054  7/1989  Japan ........................ C03G 15/00
4-79779   3/1992  Japan ........................ H02N 2/00

Primary Examiner—Thomas M. Dougherty
Attorney, Agent, or Firm—Parkhurst & Wendel, L.L.

[57] ABSTRACT

A microcomputer outputs a driving frequency signal to an oscillator circuit and the oscillator circuit oscillates at a driving frequency designated by the microcomputer. A switching control circuit outputs switching signals to an A-phase amplifier circuit and to a B-phase amplifier circuit at a predetermined timing. The A-phase amplifier circuit and the B-phase amplifier circuit each convert a DC voltage supplied by a voltage control circuit to an AC voltage and supply the same to two piezoelectric bodies of an ultrasonic motor. Due to the AC voltage being supplied to each of the two piezoelectric bodies, the ultrasonic motor is driven. At the start time of driving the ultrasonic motor, by gradually increasing the voltage level of the DC voltage outputted from the voltage control circuit and also gradually increasing the voltage level of a driving voltage to be supplied to the piezoelectric body of the ultrasonic motor, a stator and a rotor of the ultrasonic motor are gradually separated from each other. Further, in a case in which the voltage has been increased to a predetermined voltage level, the driving frequency is gradually lowered to increase the number of revolutions of the motor, thereby making it possible to lessen the vibration of the ultrasonic motor at the start time of driving. As a result, the generation of an audible sound can be prevented.

18 Claims, 24 Drawing Sheets

F I G. 6
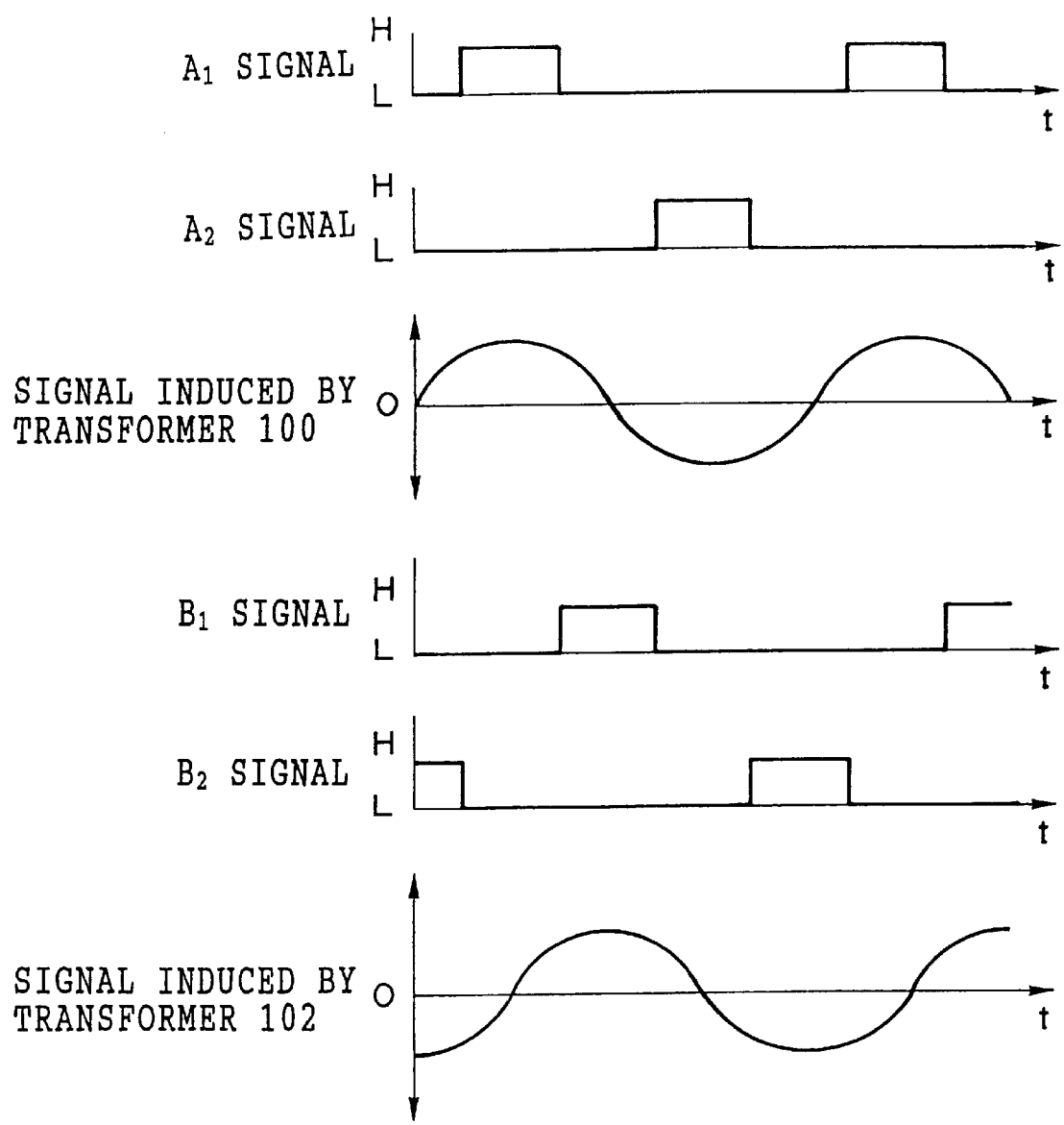

F I G. 8
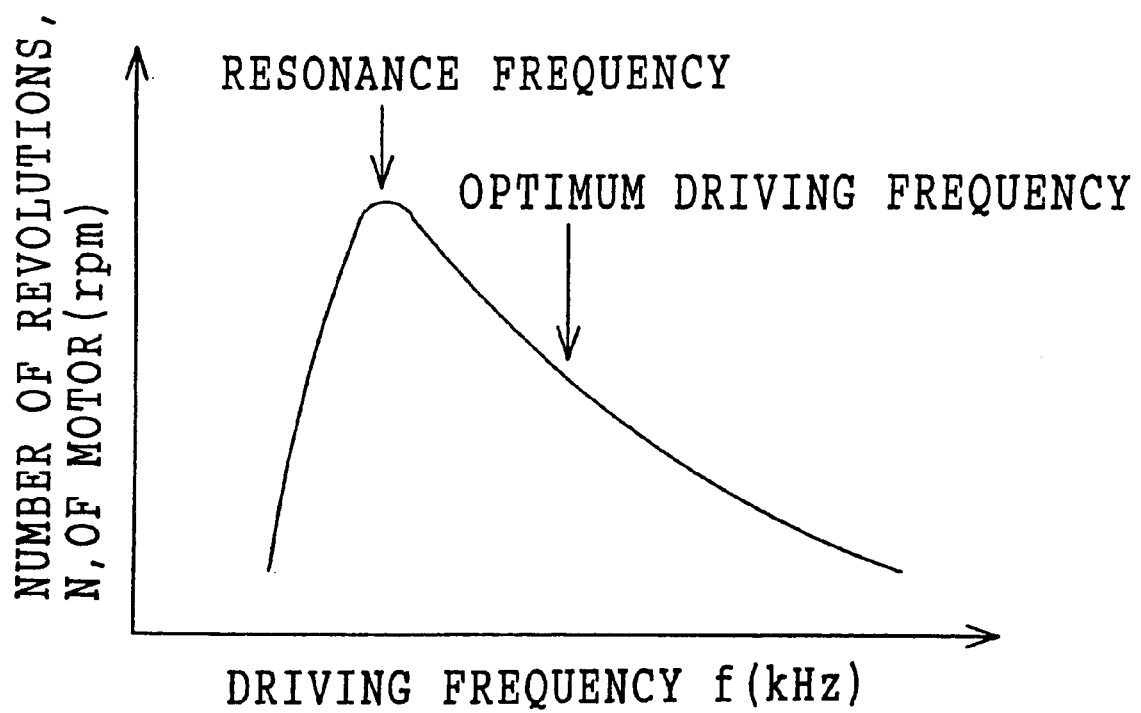

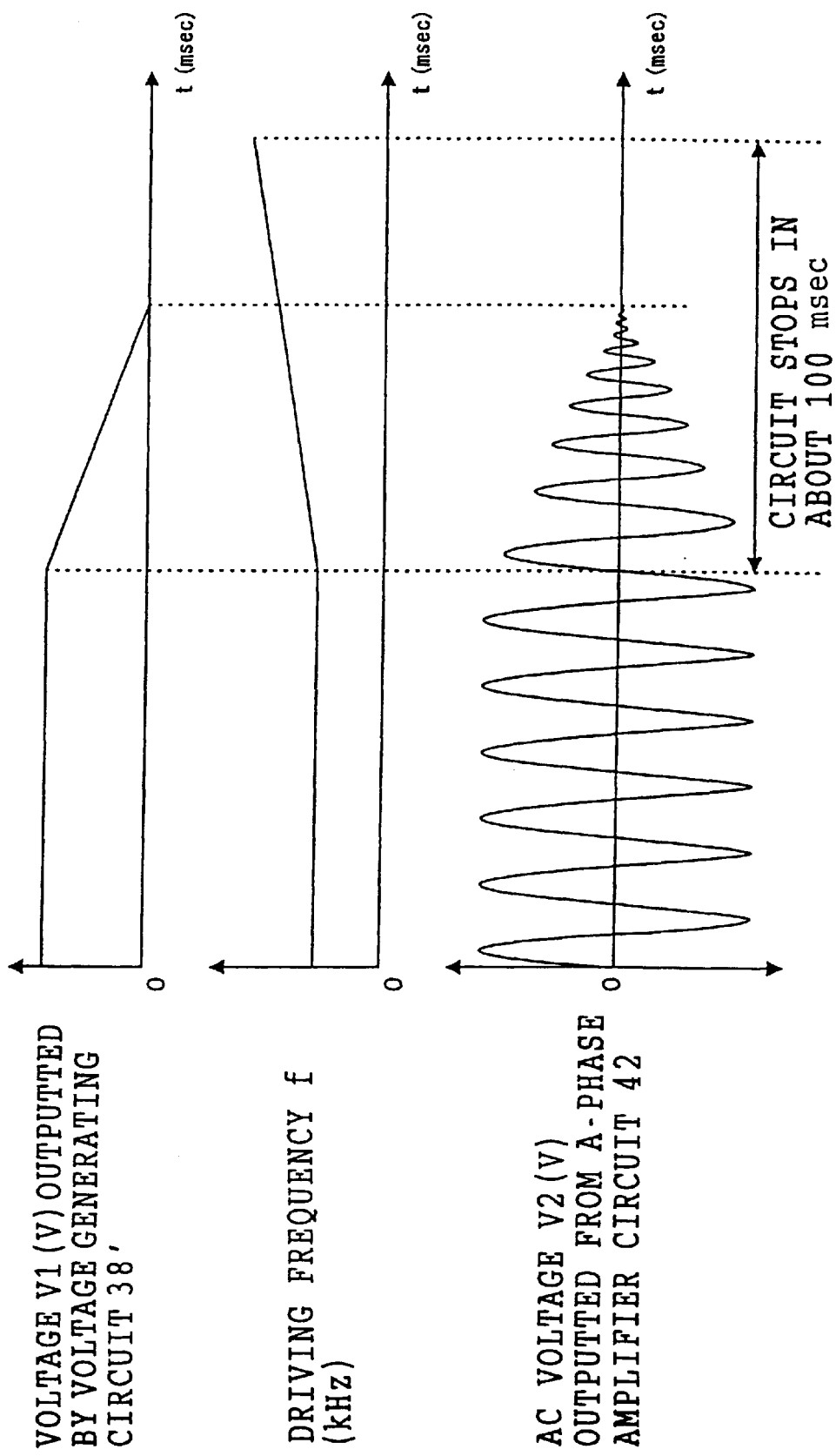

F I G. 1 2
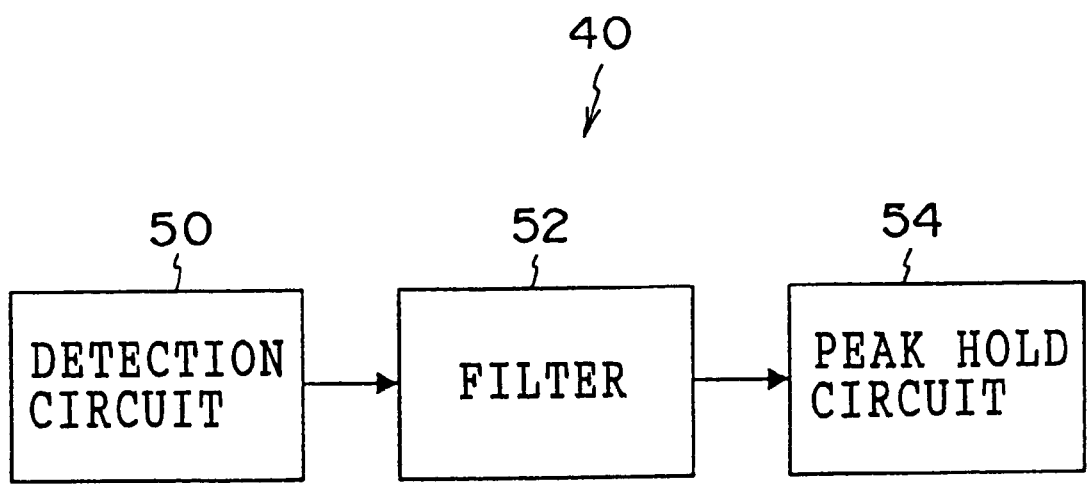

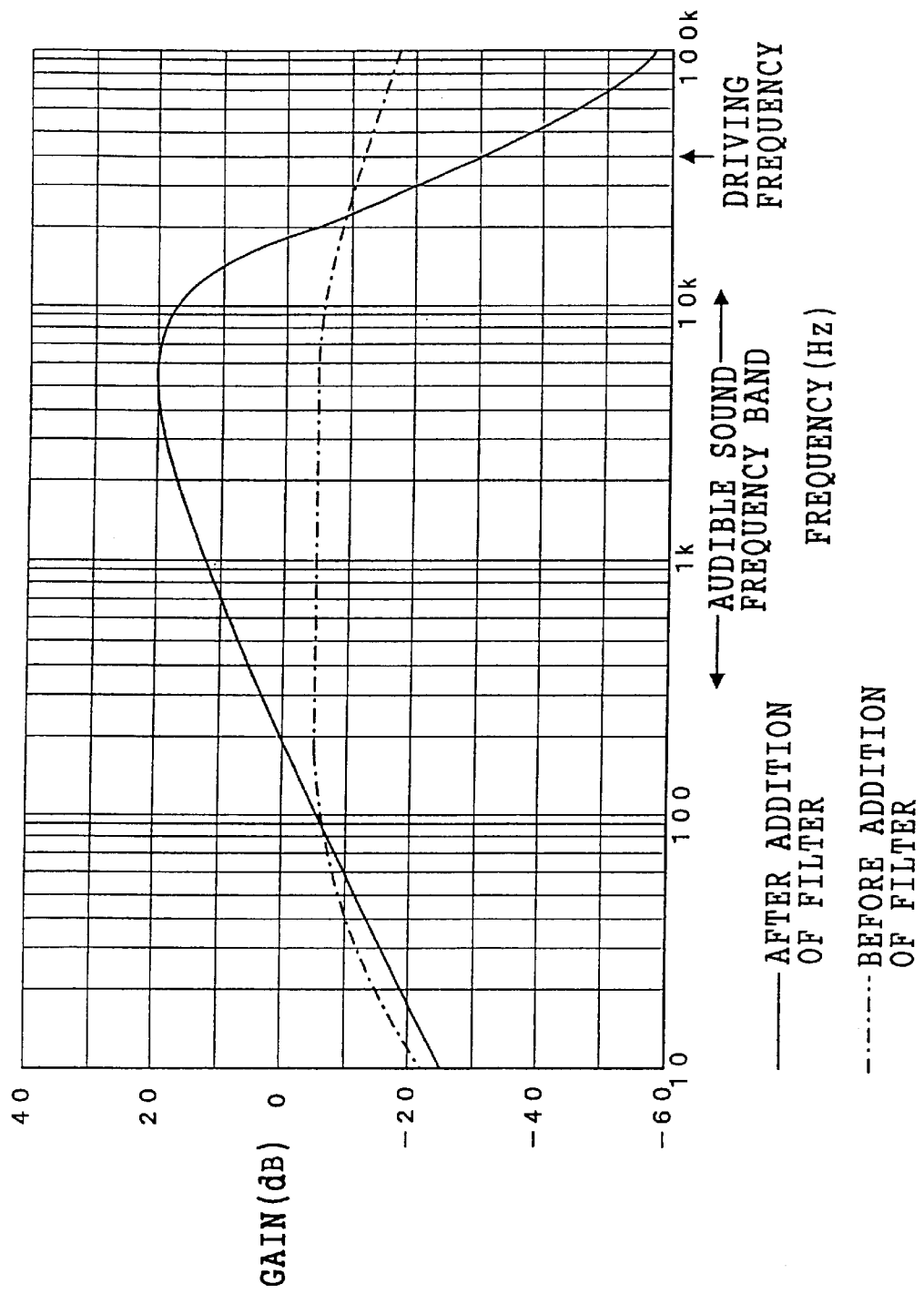

F I G. 1 4
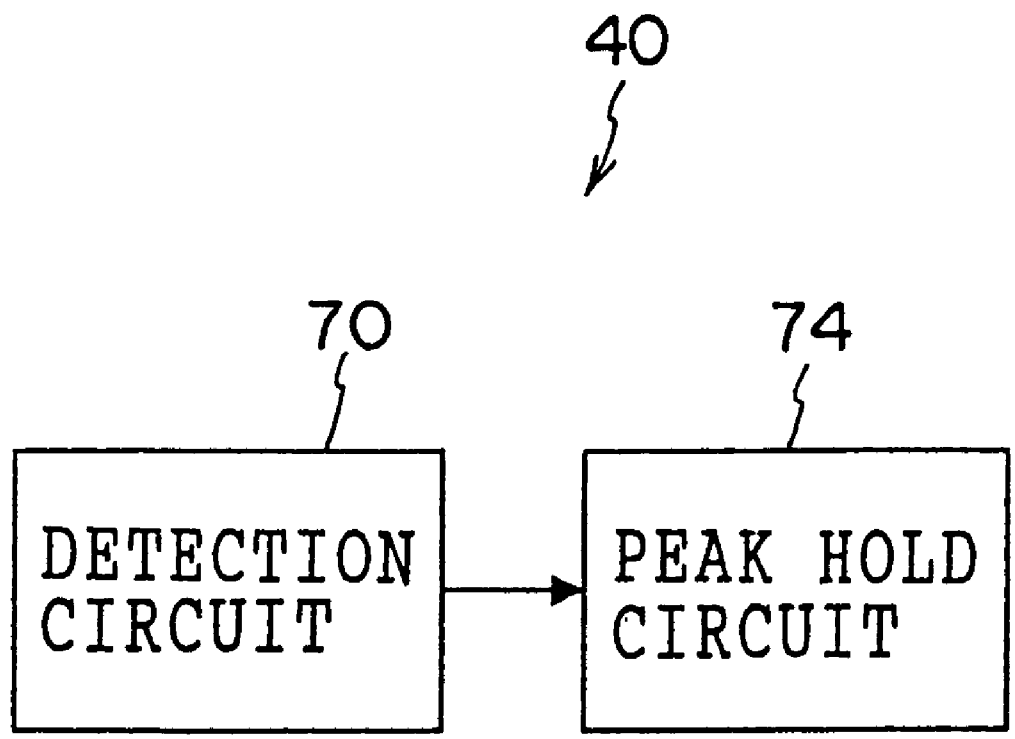

F I G. 1 5
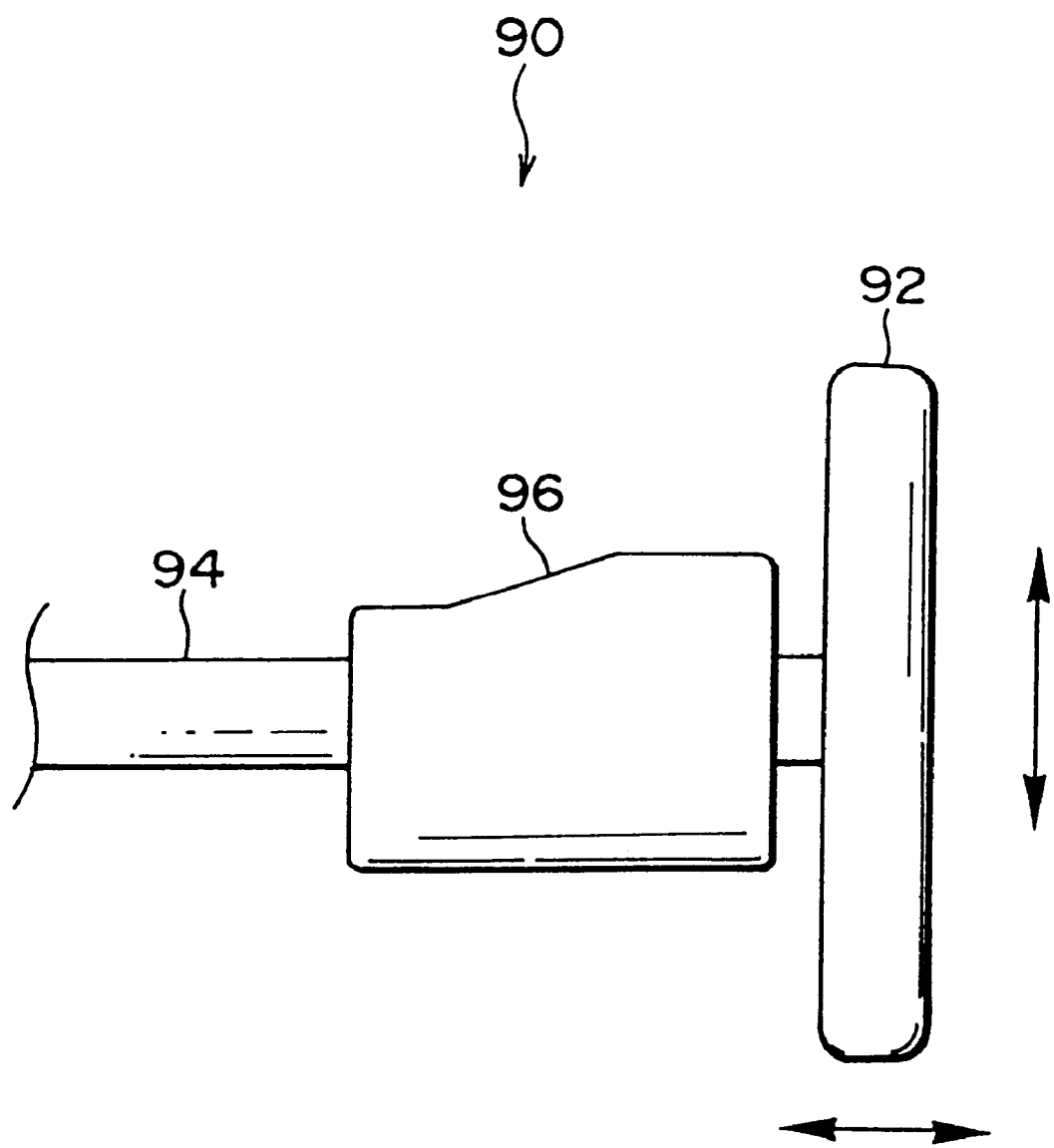

DRIVING CIRCUIT OF ULTRASONIC MOTOR

BACKGROUND OF THE INVENTION

1. Field of the Invention

The present invention relates to a driving circuit of an ultrasonic motor, for driving an ultrasonic motor.

2. Description of the Related Art

There has conventionally been known an ultrasonic motor which employs ultrasonic vibration as driving force. In a traveling-wave ultrasonic motor which is a kind of ultrasonic motor, a stator is formed with a piezoelectric body attached to a ring-shaped elastic body and a rotor mounted on a driving shaft press-contacts the stator.

The driving circuit of the ultrasonic motor supplies, to the piezoelectric body, driving signals of two phases (sine wave and cosine wave) which differ from each other by 90 degrees at a predetermined frequency. Due to mechanical vibration of the piezoelectric body caused by the driving signals of two phases, the elastic body is excited by ultrasonic vibration (traveling wave) in which the antinode and node of the vibration move annularly along the elastic body. The traveling wave causes the rotor, which press-contacts the elastic body, and the driving shaft to rotate.

It may be thought that such an ultrasonic motor might be used in, for example, a so-called tilt mechanism of a steering device of an automobile, a telescopic mechanism, and the like. One example of a driving circuit of such an ultrasonic motor is shown in FIG. 3.

As shown in FIG. 3, a driving circuit 30 is comprised of a microcomputer 32, an oscillator circuit 34, a switching control circuit 36, a band pass filter 40, an A-phase amplifier circuit 42, a B-phase amplifier circuit 44, and a voltage control circuit 38.

The microcomputer 32 outputs a driving frequency signal to the oscillator circuit 34 and the oscillator circuit 34 oscillates at a driving frequency designated by the microcomputer 32. The switching control circuit outputs switching signals to the A-phase amplifier circuit 42 and also to the B-phase amplifier circuit 44 at a predetermined timing. The A-phase amplifier circuit 42 and the B-phase amplifier circuit 44 each convert a DC (direct current) voltage supplied by the voltage control circuit 38 to an AC (alternating current) voltage and supply the AC voltage to each of piezoelectric bodies 14A and 14B of an ultrasonic motor 10.

When the above-described AC voltage is supplied to each of the piezoelectric bodies 14A and 14B of the ultrasonic motor 10, the ultrasonic motor 10 is driven.

A small aperture is formed in a region where a driving shaft and a rotor contact each other. For this reason, there is a drawback in that, when the ultrasonic motor is rotated at high speed at the time of the start of driving thereof, an audible sound may be generated due to the driving shaft and the rotor contacting each other.

In order to solve the above-described drawback, there is a method in which, as shown in FIG. 7, at the time of the start of driving, first, a driving signal whose frequency is sufficiently higher than an audible sound generation band is supplied to the piezoelectric body 14 to rotate the motor at a low number of revolutions (see FIG. 8), and a driving frequency is gradually lowered into a driving frequency band which is slightly higher than the audible sound generation band so as to gradually increase the number of revolutions, and further, the driving frequency is controlled so as to be maintained within the driving frequency band, thereby preventing generation of audible sound.

However, in the above-described method, it is not possible to completely remove the audible sound which is generated at the time of the start of driving the ultrasonic motor 10. The reason is that, at the time of the start of driving the ultrasonic motor 10, the rotor and the stator which press-contact each other are separated from each other, and the vibration generated at this time causes audible sound.

Moreover, at the time of the start of driving the ultrasonic motor 10, there exist such drawbacks as described below.

First, there is shown in FIG. 21 an example of each variation of a rotational pulse signal corresponding to the rotation of the ultrasonic motor 10, which is outputted from a rotation sensor 46 at the time of the start of driving the ultrasonic motor 10 in a conventional method, a speed indicating value (a driving frequency signal) outputted by the microcomputer 32 which controls the ultrasonic motor 10, and of a rotational speed of the ultrasonic motor 10. As shown in FIG. 21, when the speed indicating value outputted by the microcomputer 32 gradually increases, the rotational speed of the ultrasonic motor 10 also gradually increases. At the same time, the microcomputer 32 calculates the rotational speed based on the rotational pulse signal outputted from the rotation sensor 46. Meanwhile, the wider the pulse width of the rotational pulse signal, the slower the rotational speed becomes, and the narrower the pulse width, the higher the rotational speed becomes. The speed indicating value is increased until the rotational speed comes to a predetermined rotational speed.

On the other hand, there is a small difference between the timing at which the rotational speed of the ultrasonic motor 10 comes to a predetermined rotational speed and the timing at which it is determined by the microcomputer 32 that the rotational speed of the ultrasonic motor 10 comes to a predetermined rotational speed. For this reason, when it is determined by the microcomputer 32 that the rotational speed of the ultrasonic motor 10 comes to a predetermined rotational speed, there is a possibility that an actual rotational speed of the ultrasonic motor has already exceeded the predetermined rotational speed. In this case, there exists a drawback in that the driving frequency is excessively lowered to become a frequency in the audible sound generation band, which results in the generation of an audible sound.

Further, at the time of stoppage of driving the ultrasonic motor 10, there exist such drawbacks as described below.

When the ultrasonic motor 10 is stopped, it suffices that a switching signal is turned off to cause a step-up voltage outputted from the voltage control circuit 38 to be set at 0 and a driving voltage for the ultrasonic motor 10, which is to be outputted from each of the A-phase amplifier circuit 42 and the B-phase amplifier circuit 44, is further set at 0. However, when the switching signal is turned off, the AC voltage supplied to each of the piezoelectric bodies 14A and 14B of the ultrasonic motor 10 suddenly becomes 0 and the vibration of the piezoelectric bodies 14A and 14B of the ultrasonic motor 10 suddenly stops. As a result, an audible sound is generated due to the stator and the rotor contacting each other.

Moreover, when a battery source for a vehicle is used, the battery voltage may become unstable, which affects adversely the step-up voltage outputted from the voltage control circuit 38 and the AC voltage outputted from each of the A-phase amplifier circuit 42 and the B-phase amplifier circuit 44. For this reason, it is difficult to stop the ultrasonic motor 10 smoothly.

In order to solve the above-described drawbacks, there can be considered a method for insulating the noise of an entire ultrasonic motor, and the like. However, such method has the disadvantage of an increase in cost.

Further, when the ultrasonic motor is applied to the tilt mechanism of a steering device, it may be supposed that the ultrasonic motor is stopped by locking a steering wheel at a lock position and by detecting a decrease in the number of revolutions of the ultrasonic motor. However, in this case, there are such drawbacks as described below.

First, an example of variations, with the passage of time, of a driving signal outputted by the microcomputer 32 and of the number of revolutions of the ultrasonic motor 10 in a conventional method is shown in FIG. 18. When a steering wheel is moved and locked at a lock position at t0, the number of revolutions of the ultrasonic motor 10 gradually decreases. At this time, the microcomputer 32 calculates the number of revolutions at intervals of a predetermined time (i.e., calculates at each timing of t1 to t5). When the number of revolutions comes to the above-described predetermined number of revolutions $V_{stop}$ or less at t5, the driving signal is turned off to stop driving the ultrasonic motor 10.

On the other hand, in order to prevent driving of the ultrasonic motor 10 from mistakenly stopping when the rotational speed of the ultrasonic motor 10 becomes a predetermined rotational speed or less due to other factors, a predetermined number of revolutions $V_{stop}$ is set at a rather low value. For this reason, the period of time T from the time of locking the steering wheel at the lock position to the time of stoppage of driving the ultrasonic motor 10 becomes longer, thereby resulting in the generation of an audible sound.

In order to solve the above-described drawback, there may be considered a method in which a sensor is provided at the position where the steering wheel is locked and driving of the ultrasonic motor 10 is stopped by a detection signal of the sensor. However, in this case, there further arises a drawback of an increase in cost.

Moreover, in addition to the above-described drawback in that the audible sound is generated at the starting time of driving and at the stopping time of driving, there also exist the following drawbacks.

When an abnormal sound is generated from the ultrasonic motor 10, an audible sound signal is included in a feed-back signal outputted from a piezoelectric element 26 and is very feeble as compared with a driving frequency signal of the ultrasonic motor 10. It becomes necessary that the feeble audible sound signal is detected to control the number of revolutions of the ultrasonic motor 10 and generation of the abnormal sound from the ultrasonic motor 10 is prevented.

On the other hand, for example, when a wire for connecting the ultrasonic motor 10 and the driving circuit 30 of the ultrasonic motor 10 becomes longer, there exists a drawback in that electrostatic induction occurs so that an amplitude level of the driving frequency signal of the ultrasonic motor 10 becomes larger, and detection of the feeble audible sound signal is not possible.

Further, when the audible sound signal is detected from the feed-back signal, the speed indicating value is decreased and the driving frequency is increased, so that the driving frequency is separated from the audible sound generation band. However, when the ultrasonic motor 10 is driven at an unchanged speed indicating value, the rotational speed of the ultrasonic motor 10 remains low. For this reason, in the case in which the audible sound signal is detected from the feed-back signal, when the speed indicating value is instantly increased and the driving frequency is lowered, the driving frequency immediately approaches the audible sound generation band, thereby resulting in the possibility that the audible sound may be generated again.

SUMMARY OF THE INVENTION

In view of the above-described circumstances, it is an object of the present invention to provide a driving circuit of an ultrasonic motor, which can prevent generation of an audible sound in driving the ultrasonic motor.

A first aspect of the present invention is a driving circuit of an ultrasonic motor in which a driving force is obtained due to a predetermined AC voltage corresponding to a predetermined driving frequency being applied thereto, comprising: voltage increasing means which increases a voltage to the predetermined AC voltage in a predetermined time from the start time of driving the ultrasonic motor; and frequency lowering means which lowers a frequency to the predetermined driving frequency in a predetermined time from the start time of driving the ultrasonic motor.

According to the first aspect of the present invention, at the start time of driving the ultrasonic motor, when the AC voltage supplied to piezoelectric bodies of the ultrasonic motor is increased to a predetermined AC voltage in a predetermined time, a stator and a rotor of the ultrasonic motor in a press-contacting state can be gradually separated from each other. Further, due to the driving frequency being lowered in a predetermined time, the rotation of the ultrasonic motor can be gradually changed from a low number of revolutions to a high number of revolutions.

A second aspect of the present invention is a driving circuit of an ultrasonic motor in which a driving force is obtained due to a predetermined AC voltage corresponding to a predetermined driving frequency being applied thereto, comprising: voltage increasing means which continuously or stepwise increases a voltage to the predetermined AC voltage in a predetermined time from the start time of driving the ultrasonic motor; and frequency lowering means which continuously or stepwise lowers a frequency to the predetermined driving frequency in a predetermined time from the start time of driving the ultrasonic motor.

According to the second aspect of the present invention, at the start time of driving the ultrasonic motor, when the AC voltage supplied to piezoelectric bodies of the ultrasonic motor is continuously or stepwise increased in a predetermined time, a stator and a rotor of the ultrasonic motor in a press-contacting state can be gradually separated from each other. Further, due to the driving frequency being lowered continuously or stepwise in a predetermined time, the rotation of the ultrasonic motor can be gradually changed from a lower number of revolutions to a high number of revolutions.

A third aspect of the present invention is characterized by that, in the driving circuit of an ultrasonic motor according to the first aspect or the second aspect, at the start time of driving the ultrasonic motor, the operation of said frequency lowering means is started after the AC voltage has been increased to the predetermined AC voltage by said voltage increasing means.

According to the third aspect of the present invention, at the start time of driving the ultrasonic motor, the AC voltage supplied to a piezoelectric body of the ultrasonic motor is first increased gradually so that the stator and the rotor of the ultrasonic motor are gradually separated from each other. Then, after the voltage has reached the predetermined voltage level, the driving frequency is gradually decreased and the rotation of the ultrasonic motor is gradually changed from a low number of revolutions to a high number of revolutions. For this reason, the vibration of the ultrasonic motor at the start time of driving can be lessened and the generation of an audible sound can be prevented.

A fourth aspect of the present invention is a driving circuit of an ultrasonic motor in which a DC voltage supplied from a predetermined power source is transformed and converted to an AC voltage corresponding to a predetermined driving frequency, and a driving force is obtained from the AC voltage, comprising: voltage decreasing means which, at the time of stoppage of the operation of the ultrasonic motor, decreases the AC voltage in a predetermined time; and frequency raising means which, at the time of stoppage of the operation of the ultrasonic motor, raises the driving frequency in a predetermined time.

According to the fourth aspect of the present invention, at the time of stoppage of the ultrasonic motor, the DC voltage outputted from the voltage generating circuit in the driving circuit of an ultrasonic motor is decreased in a predetermined time so that the transformed AC voltage is lowered, and the driving frequency of the ultrasonic motor is increased in a predetermined time. For this reason, even if a DC voltage supplied from a predetermined power source becomes unstable, the ultrasonic motor can be gradually stopped in a stable manner, and further, the generation of an audible sound at the time of stoppage of the ultrasonic motor can be prevented.

A fifth aspect of the present invention is a driving circuit of an ultrasonic motor in which a DC voltage supplied from a predetermined power source is transformed and converted to an AC voltage corresponding to a predetermined driving frequency, and a driving force is obtained from the AC voltage, comprising: voltage decreasing means which, at the time of stoppage of the operation of the ultrasonic motor, continuously or stepwise decreases the AC voltage in a predetermined time; and frequency raising means which gradually raises the driving frequency synchronously with the decrease of voltage by said voltage decreasing means.

According to the fifth aspect of the present invention, at the time of stoppage of the ultrasonic motor, the DC voltage outputted from the voltage generating circuit in the driving circuit of an ultrasonic motor is gradually decreased to lower the transformed AC voltage continuously or stepwise, and further, synchronously with the decrease of the voltage, the driving frequency of the ultrasonic motor is gradually increased. For this reason, even if the DC voltage supplied from the predetermined power source becomes unstable and the transformed AC voltage also becomes unstable, the ultrasonic motor can be gradually stopped in a stable manner and the generation of an audible sound at the time of stoppage of the ultrasonic motor can be prevented.

BRIEF DESCRIPTION OF THE DRAWINGS

FIG. 6 is a diagram which shows the relationship between switching signals outputted from a switching control circuit according to the first embodiment and driving signals induced by transformers.

FIG. 8 is a diagram which shows the relationship between the number of revolutions and the driving frequency of the ultrasonic motor according to the first embodiment.

FIG. 11 is a diagram which shows the relationship between a voltage outputted by the voltage generating circuit of the ultrasonic motor driving circuit, a driving frequency of the ultrasonic motor, and an AC voltage outputted by an A-phase amplifier circuit according to the second embodiment.

FIG. 12 is a block diagram which shows the structure of a band pass filter according to a third embodiment of the present invention.

FIG. 13 is a diagram which shows frequency-gain characteristics of the band pass filter according to the third embodiment.

FIG. 14 is a block diagram which shows the structure of a conventional band pass filter.

FIG. 15 is a schematic structural diagram which shows a principal portion of a steering device according to a fourth embodiment of the present invention.

DESCRIPTION OF THE PREFERRED EMBODIMENTS

[First Embodiment]

Figure 2:
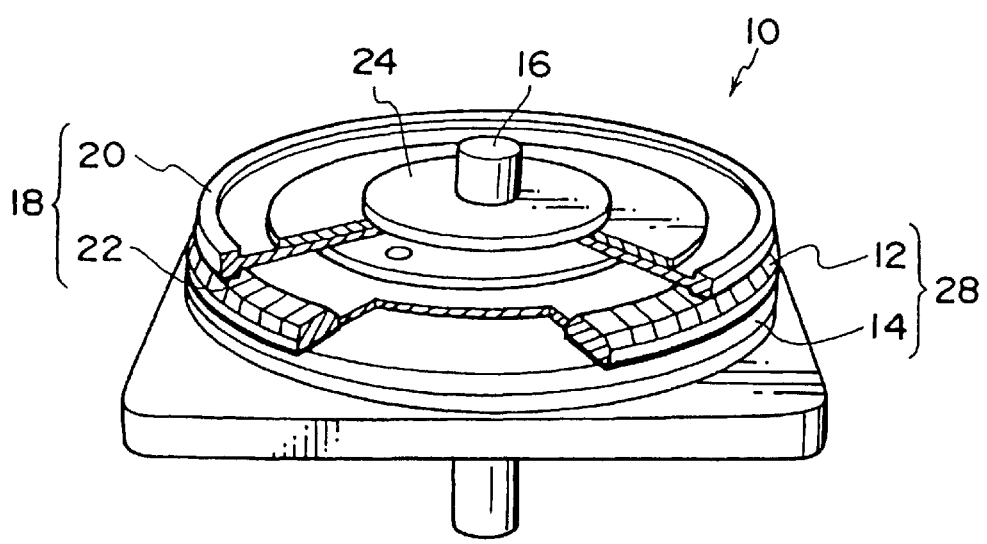
FIG. 2 is a partially sectional perspective view which shows a schematic structure of an ultrasonic motor.

Referring now to the attached drawings, a first embodiment of the present invention will be hereinafter described in detail. FIG. 2 shows a traveling-wave ultrasonic motor 10. The ultrasonic motor 10 includes a ring-shaped elastic body 12 made from copper alloy or the like. A stator 28 is formed with a piezoelectric body 14 attached to the elastic body 12.

The piezoelectric body 14 is formed from piezoelectric materials which convert an electric signal to a mechanical signal and the materials are arranged to form a ring-shaped configuration in such a manner as to be divided by a large number of electrodes. A rotor 18 mounted on a driving shaft 16 is formed with a ring-shaped slider 22 adhering to a rotor ring 20 made from aluminum alloy or the like. The slider 22 press-contacts the elastic body 12 by a spring 24. As the slider 22, for example, engineering plastics are used to obtain stable frictional force and coefficient of friction. As a result, the rotor 18 can be driven at high efficiency.

Figure 3:
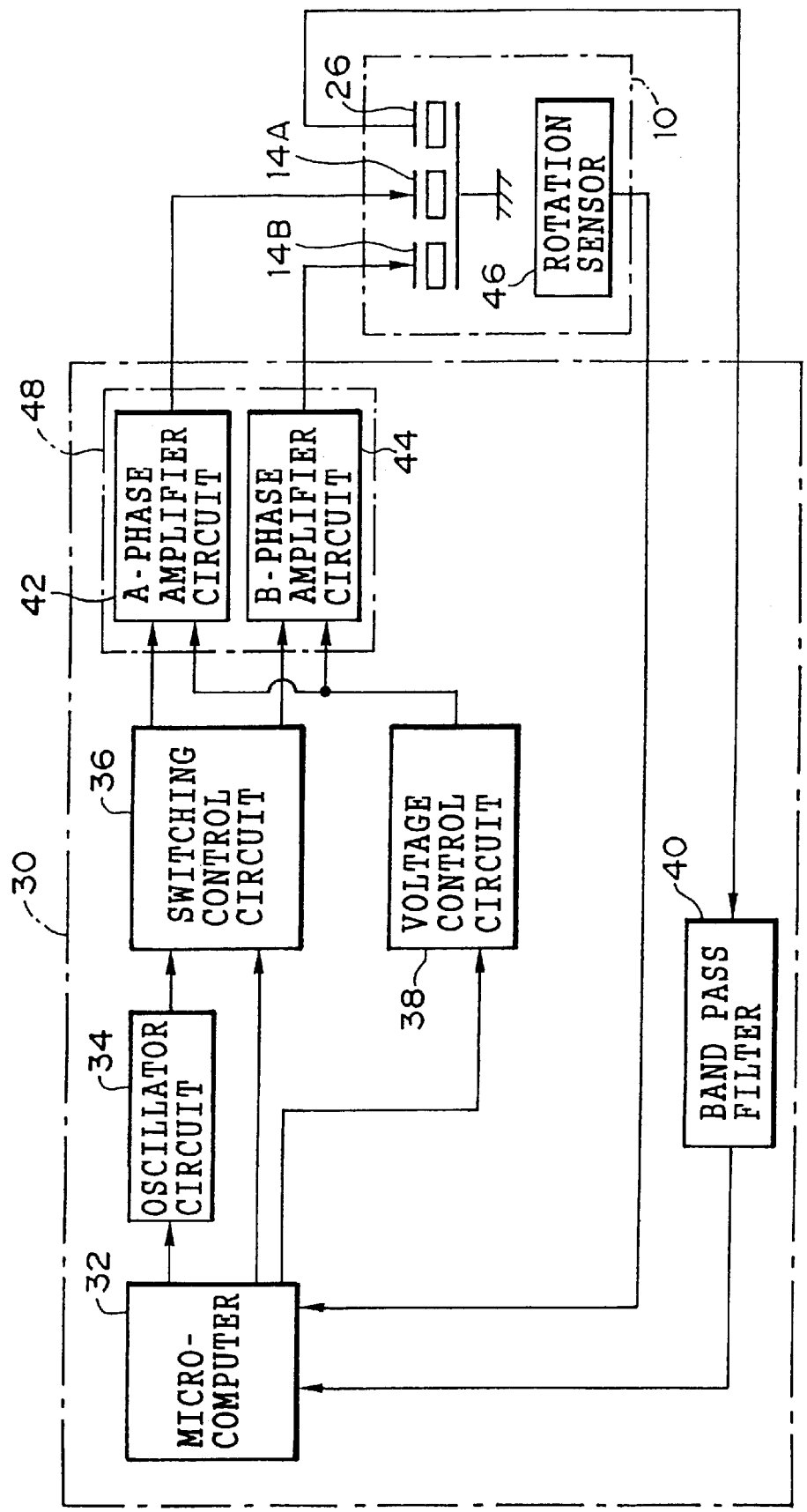
FIG. 3 is a block diagram which shows the schematic structure including the ultrasonic motor and an ultrasonic motor driving circuit according to the first embodiment.

Further, a piezoelectric element 26 (see FIG. 3) is attached to the elastic body 12. As shown in FIG. 3, one end of the piezoelectric element 26 is grounded and the other end thereof is connected to an input end of a band pass filter 40 of a driving circuit 30.

The piezoelectric element 26 detects a vibration of the elastic body 12 and outputs an alternating current signal (a vibration feed-back signal) whose amplitude and cycle each correspond to the vibration. An output end of the band pass filter 40 is connected to one of the input ends of a microcomputer 32. The band pass filter 40 detects the vibration feed-back signal outputted from the piezoelectric element 26 and outputs the signal to the microcomputer 32.

Further, a rotation sensor 46 is mounted to the ultrasonic motor 10 and an output end of the rotation sensor 46 is connected to the other one of the input ends of the microcomputer 32.

The rotation sensor 46 is comprised of a magnet (not shown), a Hall element (not shown), and the like. When a variation of magnetic flux on the surface of the magnet is detected by the Hall element and the rotor 18 is thereby rotated, a pulse signal whose cycle corresponds to the rotational speed of the rotor 18 is outputted to the microcomputer 32.

An input end of a driving frequency signal of an oscillator circuit 34 is connected to an output end of a driving frequency signal of the microcomputer 32. One of the input ends of a switching control circuit 36 is connected to a switching signal output end. The output end of the oscillator circuit 34 is connected to the other one of the input ends of the switching control circuit 36. The oscillator circuit 34 oscillates at an oscillation frequency corresponding to the driving frequency signal outputted from the microcomputer 32.

Meanwhile, when the voltage level of the driving frequency signal outputted from the microcomputer 32 is high, the oscillator circuit 34 oscillates at a low frequency. When the voltage level of the driving frequency signal outputted from the microcomputer 32 is low, the oscillator circuit 34 oscillates at a high frequency.

One output end of the switching control circuit 36 is connected to one input end of an A-phase amplifier circuit 42 of a driving signal generating circuit 48 and the other output end of the switching control circuit 36 is connected to one input end of a B-phase amplifier circuit 44 of the driving signal generating circuit 48. The switching control circuit 36 outputs a driving pulse to each of the A-phase amplifier circuit 42 and the B-phase amplifier circuit 44 while switching the driving pulse correspondingly to an oscillation frequency oscillated from the oscillator circuit 34.

The other input end of the A-phase amplifier circuit 42 and the other input end of the B-phase amplifier circuit 44 are connected to an output end of the voltage control circuit 38. A step-up signal input end of the voltage control circuit 38 is connected to a step-up signal output end of the microcomputer 32. When the step-up signal outputted from the microcomputer 32 is turned on, the voltage control circuit 38 allows step-up of a DC voltage supplied from a constant voltage source (not shown) to a predetermined AC voltage and further to a predetermined DC voltage by rectification and smoothing, and also supplies the DC voltage to each of the A-phase amplifier circuit 42 and the B-phase amplifier circuit 44.

Figure 4:
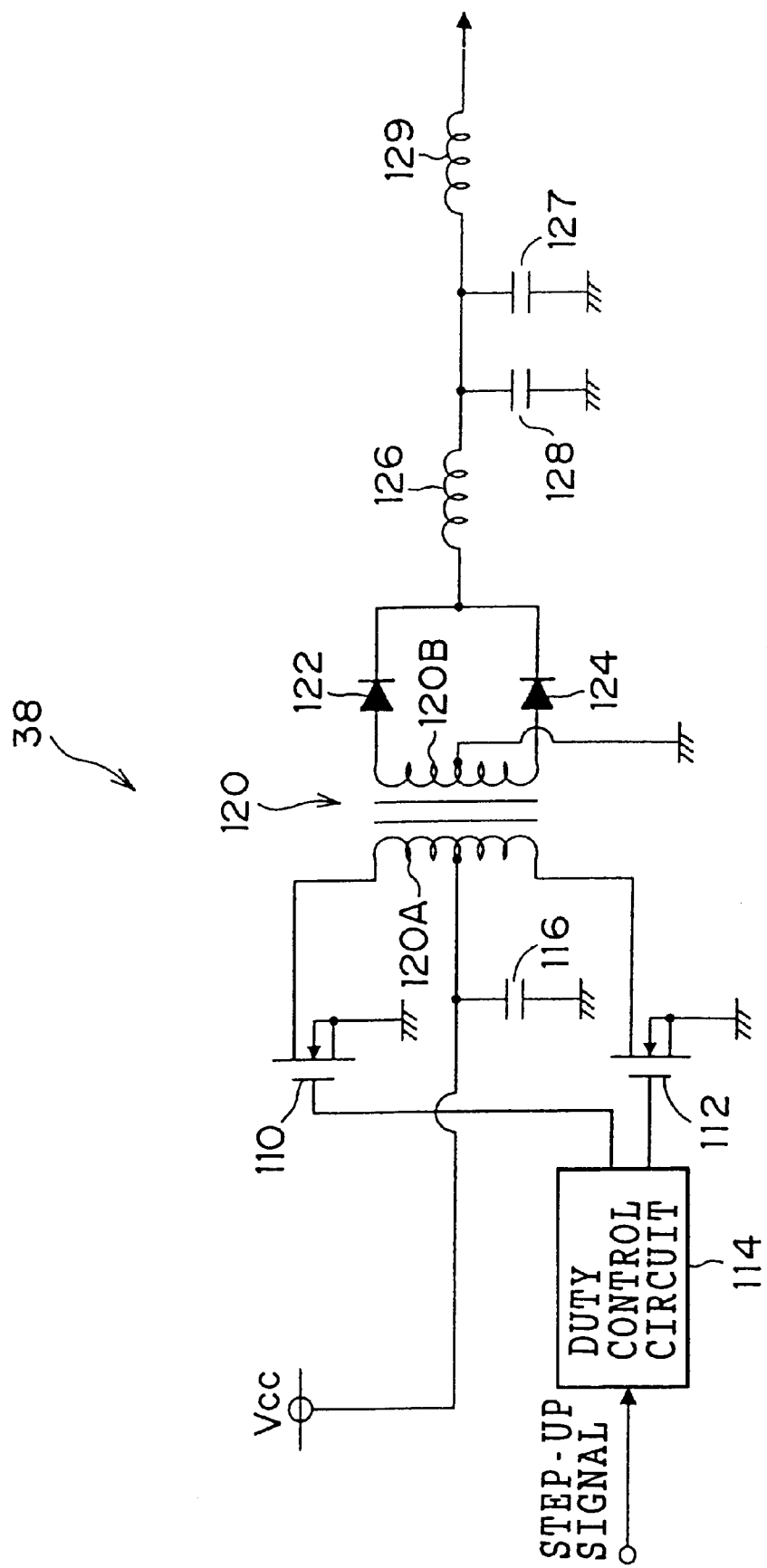
FIG. 4 is a circuit diagram of a voltage control circuit in the ultrasonic motor driving circuit according to the first embodiment.

The voltage control circuit 38 has a circuit structure as shown in FIG. 4.

The voltage control circuit 38 includes a transformer 120. One end of a capacitor 116 and a battery source for a vehicle (in FIG. 4, Vcc) are each connected via a power source line to a middle point of a primary coil 120A of the transformer 120 and the other end of the capacitor 116 is grounded.

One end of the primary coil 120A of the transformer 120 is connected to a drain of a MOSFET 110 serving as a switching element. A gate of the MOSFET 110 is connected to one output end of a duty control circuit 114 and a source of the MOSFET 110 is grounded.

The other end of the primary coil 120A of the transformer 120 is connected to a drain of a MOSFET 112 serving as a switching element. A gate of the MOSFET 112 is connected to the other output end of the duty control circuit 114 and a source of the MOSFET 112 is grounded.

An anode of a diode 122 serving as a rectifying element is connected to one end of a secondary coil 120B of the transformer 120 and an anode of a diode 124 serving as a rectifying element is connected to the other end of the secondary coil 120B of the transformer 120. Further, the middle point of the secondary coil 120B of the transformer 120 is grounded.

Cathodes of the diodes 122 and 124 are each connected to one end of a coil 126 which serves as an inductance element. One end of a capacitor 128 is connected to the other end of the coil 126 and the other end of the capacitor 128 is grounded. Also connected to the other end of the coil 126 are one end of a capacitor 127 and one end of a coil 129. The other end of the capacitor 127 is grounded. The other end of the coil 129 is connected to any one of input ends of the A-phase amplifier circuit 42 and the B-phase amplifier circuit 44 and a DC voltage is supplied from the voltage control circuit 38 to the input end to which the other end of the coil 129 is connected.

Further, a step-up signal output end of the microcomputer 32 is connected to an input end of the duty control circuit 114. When the step-up signal outputted from the step-up signal output end is turned on, the MOSFET 110 and the MOSFET 112 are each switched on/off at a predetermined timing to gradually increase a DC voltage supplied from a constant voltage source (not shown).

Figure 5:
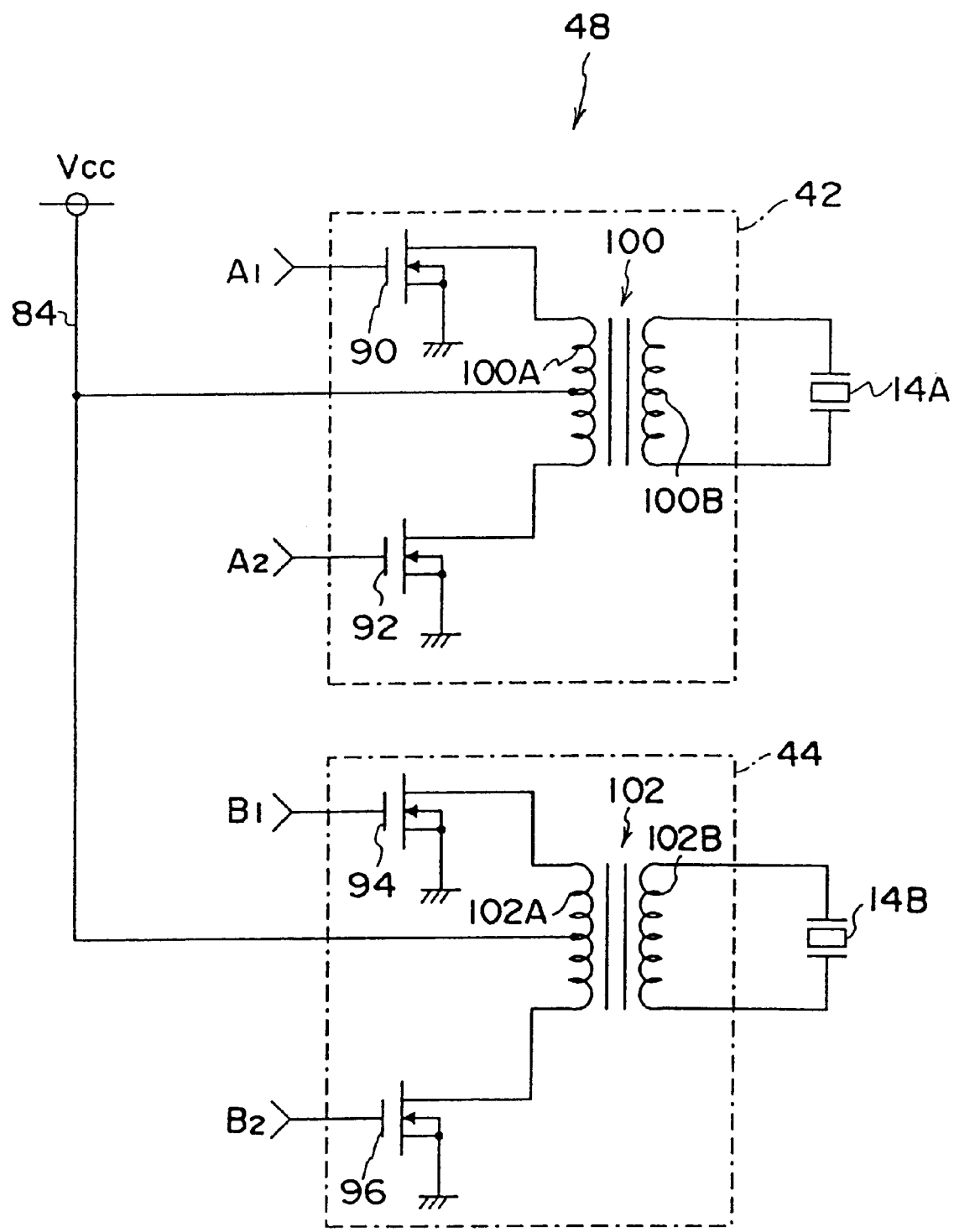
FIG. 5 is a circuit diagram which shows an example of a driving signal generating circuit according to the first embodiment.
Figure 7:
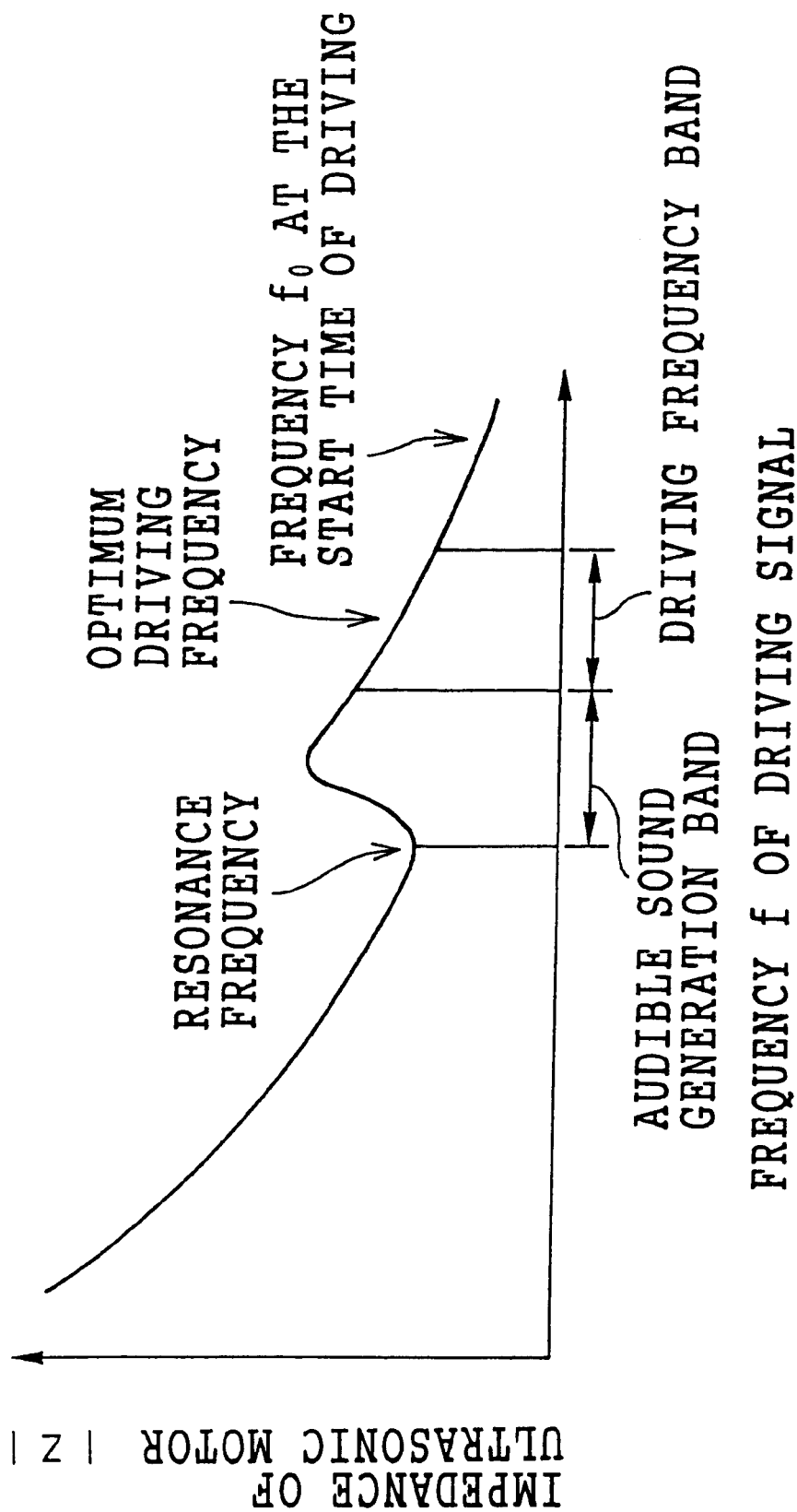
FIG. 7 is a diagram which shows variation of impedance of the ultrasonic motor, which is accompanied with variation of a driving frequency of the ultrasonic motor, a resonance frequency, an audible sound generation band, a driving frequency band, and the like according to the first embodiment.

The driving signal generating circuit 48 has the circuit structure as shown in FIG. 5. The A-phase amplifier circuit 42 is connected to a piezoelectric body 14A of the ultrasonic motor 10 and supplies a sine-wave signal to the piezoelectric body 14A. The B-phase amplifier circuit 44 is connected to a piezoelectric body 14B of the ultrasonic motor 10 and supplies, to the piezoelectric body 14B, a cosine-wave signal of which phase differs from the sine-wave signal supplied to the piezoelectric body 14A by the A-phase amplifier circuit 42 by 90 degrees. The other ends of the piezoelectric bodies 14A and 14B are each grounded. The piezoelectric bodies 14A and 14B form the piezoelectric body 14 of the ultrasonic motor 10.

The A-phase amplifier circuit 42 includes a transformer 100. One end of a branched portion of a power source line 84 is connected to a middle point of a primary coil 100A of the transformer 100 and the other end of the power source line 84 is connected to an output end of the voltage control circuit 38.

One end of the primary coil 100A of the transformer 100 is connected to a drain of a MOSFET 90 which serves as a switching element and the other end thereof is connected to a drain of a MOSFET 92. Each source of the MOSFET 90 and the MOSFET 92 is grounded. Further, both ends of a secondary coil 100B of the transformer 100 are each connected to the piezoelectric body 14A.

The B-phase amplifier circuit 44 includes a transformer 102. The other end of the branched portion of the power source line 84 is connected to the middle point of a primary coil 102A of the transformer 102.

One end of the primary coil 102A of the transformer 102 is connected to a drain of the MOSFET 94 which serves as a switching element and the other end thereof is connected to a drain of the MOSFET 96. Each source of the MOSFET 94 and the MOSFET 96 is grounded. Further, both ends of a secondary coil 102B of the transformer 102 are each connected to the piezoelectric body 14B.

The gate of each MOSFET 90, 92, 94, and 96 is connected to the switching control circuit 36. These MOSFETs 90, 92, 94, and 96 are switched on/off in accordance with switching signals $A_1$, $A_2$, $B_1$, and $B_2$ inputted from the switching control circuit 36.

Next, an operation of the first embodiment will be described in detail with reference to the attached drawings.

Figure 1:
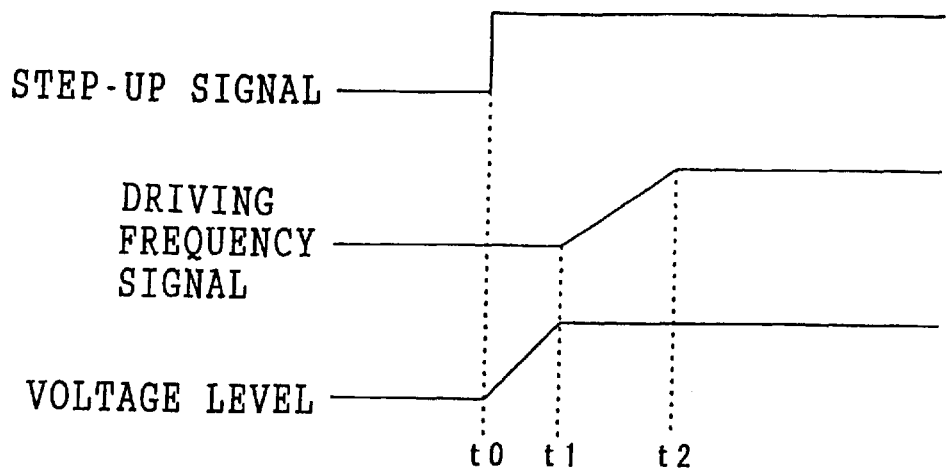
FIG. 1 is a timing chart which shows variations of a step-up signal outputted from a microcomputer, a driving frequency signal outputted from an oscillator circuit, and a voltage applied to the ultrasonic motor at the time of the start of driving an ultrasonic motor according to a first embodiment of the present invention.

FIG. 1 shows a timing chart which indicates, at the time of the start of driving the ultrasonic motor 10, variations of a step-up signal outputted from the microcomputer 32 to the voltage control circuit 38, a driving frequency signal outputted from the microcomputer 32 to the oscillator circuit 34, and the voltage level of an output voltage outputted from the voltage control circuit 38.

As shown in FIG. 1, at the start time of driving of the ultrasonic motor 10, first, the step-up signal outputted from the microcomputer 32 to the voltage control circuit 38 is turned on at t0. The voltage control circuit 38 supplies a voltage from a constant voltage source (indicated by Vcc in the drawings) to the primary coil 120A of the transformer 120. When the step-up signal is turned on, the duty control circuit 114 of the voltage control circuit 38 starts inputting switching signals to the gates of the MOSFET 110 and the MOSFET 112 at a predetermined timing, and therefore, an electric current supplied to the primary coil 120A of the transformer 120 is turned on or off.

An AC voltage is induced to the secondary coil 120B of the transformer 120. The AC voltage is subjected to full-wave rectification by the diodes 122 and 124 and is smoothed by the coil 126 and the capacitor 128 to be turned into a DC voltage. The DC voltage is charged in the capacitor 127 and is further discharged via the coil 129. For this reason, the voltage level of the DC voltage outputted by the voltage control circuit 38 to the A-phase amplifier circuit 42 and the B-phase amplifier circuit 44 gradually becomes higher as shown in FIG. 1.

Further, a signal level of the driving frequency signal outputted from the microcomputer 32 to the oscillator circuit 34 is 0 at t0, and therefore, the oscillation frequency outputted by the oscillator circuit 34 becomes a predetermined high frequency. For this reason, the ultrasonic motor 10 starts rotating at a predetermined low number of revolutions.

The switching control circuit 36 outputs the switching signals $A_1$, $A_2$, $B_1$, and $B_2$ for turning on or off the MOSFETs 90, 92, 94, and 96 of the A-phase amplifier circuit 42 and the B-phase amplifier circuit 44.

As shown in FIG. 6, the switching signals each switch on or off any one of the MOSFETs 90, 92, 94, and 96 at a predetermined duty ratio, and set other MOSFETs in an off state, and further, switch the MOSFETs to be switched on or off in the order of the MOSFETs 90, 94, 92, and 96 at intervals of a cycle one fourth that of a driving frequency fs at the start time of driving. As a result, AC driving voltages which each have the frequency fs at the start time of driving and of which phases differ from each other by 90 degrees are respectively induced to the secondary coils 100B and 102B of the transformers 100 and 102.

Due to the driving voltages being supplied to the piezoelectric bodies 14A and 14B, a traveling wave excites the elastic body 12 of the ultrasonic motor 10 so that the driving shaft 16 and the rotor 18 are rotated. Further, as described above, the voltage level of the DC voltage outputted from the voltage control circuit 38 gradually becomes higher, and the voltage level of the driving voltage also gradually becomes higher. For this reason, the stator 28 and the rotor 18 of the ultrasonic motor 10 in a pressure-contacting state are slowly separated from each other.

Subsequently, when the voltage level outputted from the voltage control circuit 38 comes to a predetermined voltage level at t1, the level of the driving frequency signal outputted from the microcomputer 32 is gradually raised. For this reason, the oscillation frequency outputted from the oscillator circuit 34 gradually becomes low, and therefore, the number of revolutions of the ultrasonic motor 10 gradually becomes higher.

When the driving frequency has come to a predetermined driving frequency at t2, the microcomputer 32 controls the driving frequency by changing the timing at which the MOSFETs 90, 92, 94, and 96 of the driving signal generating circuit 48 are switched on or off so as to follow an optimum driving frequency while monitoring a vibration feed-back signal detected by the piezoelectric element 26 mounted to the elastic body 12 and a rotational pulse signal corresponding to the rotational speed of the rotor 18 and outputted from the rotation sensor 46 mounted to the ultrasonic motor 10.

As described above, at the start time of driving the ultrasonic motor 10, first, by gradually raising the voltage level of a DC voltage outputted from the voltage control circuit 38 and also gradually increasing the voltage level of the driving voltage supplied to the piezoelectric body 14 of the ultrasonic motor 10, the stator 28 and the rotor 18 of the ultrasonic motor 10 are gradually separated from each other. Further, with the driving frequency remaining high until the driving voltage comes to a predetermined voltage level, the ultrasonic motor 10 is rotated at a low number of revolutions. For this reason, the vibration of the ultrasonic motor 10 at the start time of driving can be lessened, thereby preventing generation of an audible sound.

Further, when the voltage level of the DC voltage outputted from the voltage control circuit 38 comes to the predetermined voltage level, a driving frequency signal outputted from the microcomputer 32 is gradually made higher and the oscillation frequency outputted from the oscillator circuit 34 is gradually lowered. For this reason, the number of revolutions of the ultrasonic motor 10 gradually becomes high, and therefore, it is possible to prevent generation of an audible sound, which is caused by the driving shaft 16 and the rotor 18 of the ultrasonic motor 10 contacting each other.

Meanwhile, the period in time from t0 to t1 and the period in time from t1 to t2 each can be set arbitrarily. Further, in the present embodiment, control is made in such a manner that, after the voltage level of the DC voltage outputted from the voltage control circuit 38 has been gradually increased to the predetermined voltage level, the driving frequency signal outputted from the microcomputer 32 is gradually made higher. However, the present invention is not limited to the same, and before the driving voltage comes to the predetermined voltage level, control which is provided to gradually raise the driving frequency signal may be started.

Further, without using the structure in which the DC voltage outputted from the voltage control circuit 38 is gradually increased by the capacitor 127 and the coil 129, the structure having no capacitor 127 and no coil 129 may be used to gradually increase the DC voltage to be supplied to the voltage control circuit 38. Moreover, there may also be used the structure in which, with the DC current outputted by the voltage control circuit 38 made fixedly, the AC voltage outputted by the driving signal generating circuit 48 is gradually increased.

[Second Embodiment]

Next, a second embodiment will be described. It should be noted that the same portions as the structure including the ultrasonic motor 10 and the driving circuit 30 in the first embodiment will be denoted by the same reference numerals, and a detailed description thereof will be omitted.

Figure 9:
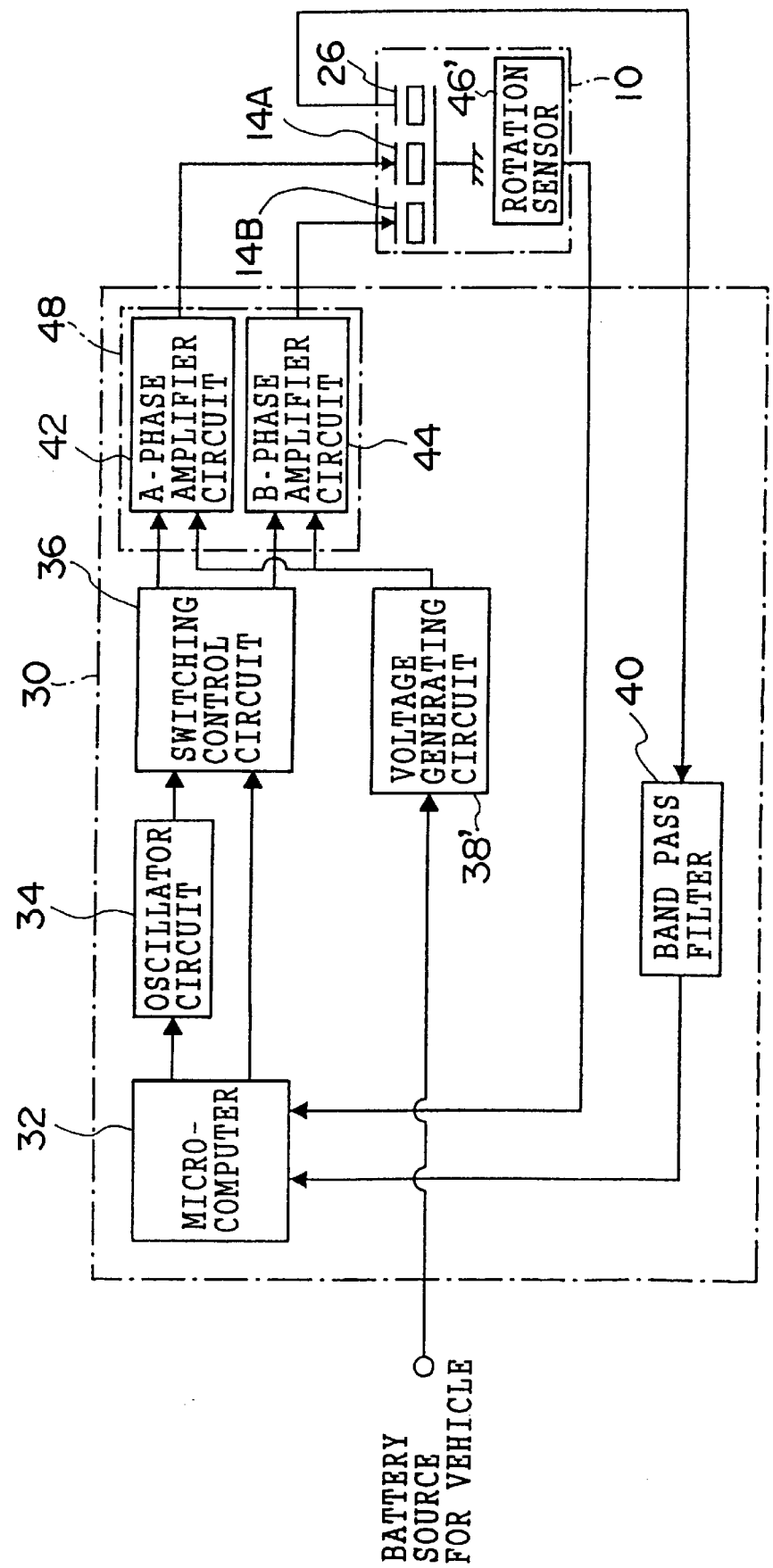
FIG. 9 is a block diagram which shows a schematic structure including an ultrasonic motor and an ultrasonic motor driving circuit according to a second embodiment of the present invention.

First, the structure of a rotation sensor 46' in the second embodiment will be described. The rotation sensor 46' shown in FIG. 9 is comprised of a light emitting element (not shown) and a light receiving element (not shown) and is disposed in such a manner that light emitted from the light emitting element and reflected by a ring-shaped reflection seal (not shown) attached to an upper surface of the rotor 18 is received by the light receiving element. In the same manner as in the rotation sensor 46 in the first embodiment, when the rotor 18 rotates, the rotation sensor 46' outputs, to the microcomputer 32, a pulse signal of a cycle corresponding to the rotational speed of the rotor 18.

Figure 10:
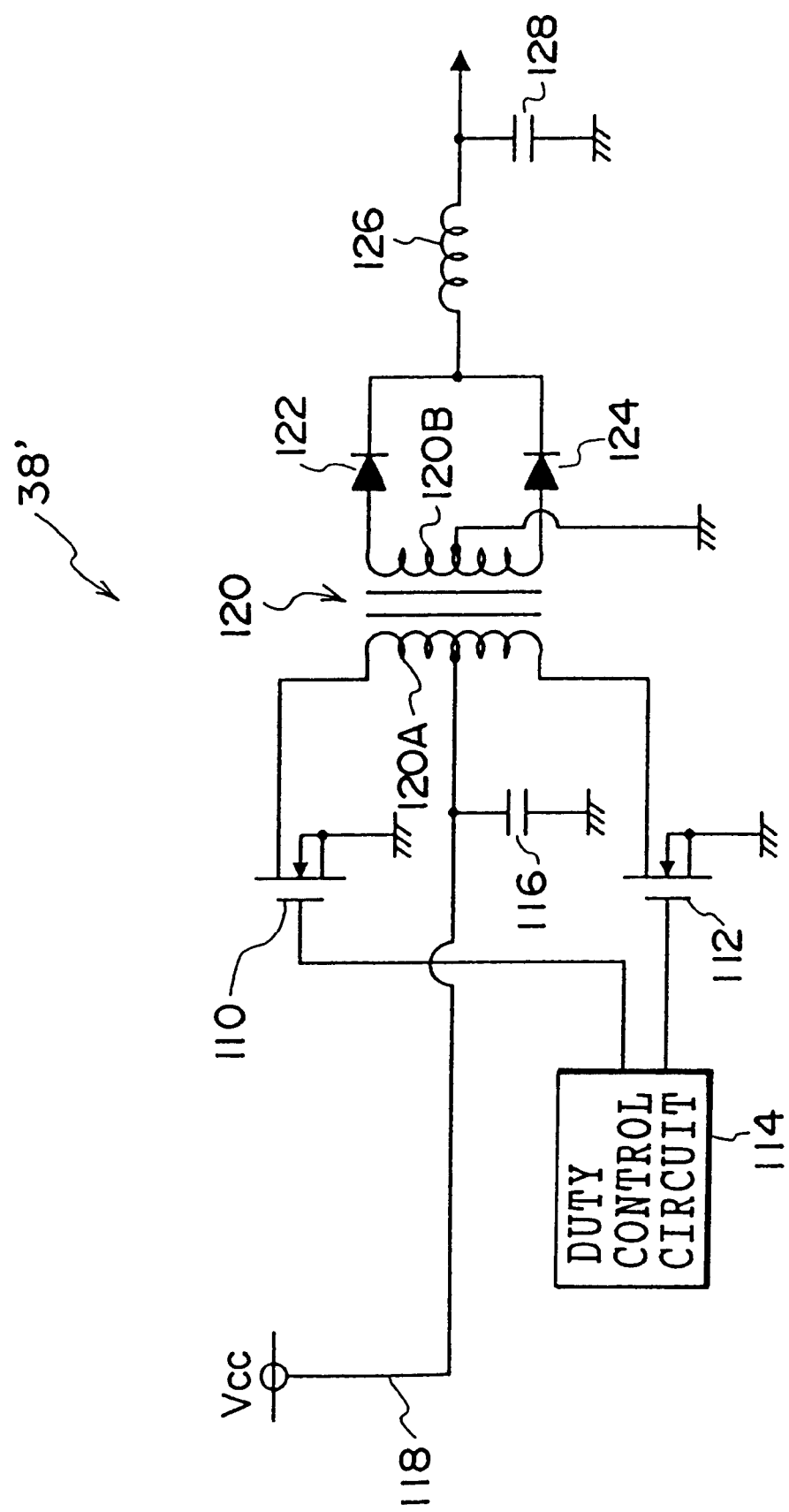
FIG. 10 is a circuit diagram of a voltage control circuit in the ultrasonic motor driving circuit according to the second embodiment.

Next, the structure of a voltage generating circuit 38' will be described. As shown in FIG. 10, the voltage generating circuit 38' is structured with no capacitor 127 and no coil 129 removed from the voltage generating circuit 38 in the first embodiment. The voltage generating circuit 38' supplies, as voltage transformation (for example, 100V), a voltage (for example, 12V) of the DC voltage supplied from a battery source for a vehicle to the A-phase amplifier circuit 42 and also to the B-phase amplifier circuit 44. The A-phase amplifier circuit 42 and the B-phase amplifier circuit 44 each convert the DC current supplied from the voltage generating circuit 38' to an AC voltage (for example, 200V) and supply the converted voltage to each of the piezoelectric bodies 14A and 14B.

Next, an operation of the second embodiment will be described in detail with reference to these drawings.

When the ultrasonic motor 10 is driven, a driving frequency signal is outputted from the microcomputer 32 to the oscillator circuit 34. The oscillator circuit 34 starts oscillating at a driving frequency specified by the microcomputer 32.

In the voltage generating circuit 38', a voltage is supplied from the battery source for a vehicle to the primary coil 120A of the transformer 120 and switching signals are inputted from the duty control circuit 114 to the gates of the MOSFET 110 and the MOSFET 112 at a predetermined timing so that an electric current supplied to the primary coil 120A of the transformer 120 is turned on or off. Then, an AC voltage is induced to the secondary coil 120B of the transformer 120 and is subjected to full-wave rectification by the diodes 122 and 124. The AC voltage is further smoothed by the coil 126 and the capacitor 128 so as to be turned into a DC voltage. The DC voltage is supplied to each of the A-phase amplifier circuit 42 and the B-phase amplifier circuit 44.

The switching control circuit 36 outputs switching signals $A_1$, $A_2$, $B_1$, and $B_2$ for switching on or off the MOSFETs 90, 92, 94, and 96 of the A-phase amplifier circuit 42 and the B-phase amplifier circuit 44.

As shown in FIG. 6, the switching signals each switch on or off any one of the MOSFETs 90, 92, 94, and 96 at a predetermined duty ratio, and set other MOSFETs in an off state, and further, switch the MOSFETs to be switched on or off in the order of the MOSFETs 90, 94, 92, and 96 at intervals of a cycle one fourth that of a driving frequency fs at the start time of driving. As a result, AC driving voltages which each have the frequency fs at the start time of driving and of which phases differ from each other by 90 degrees are respectively induced to the secondary coils 100B and 102B of the transformers 100 and 102.

Due to the driving signals being supplied to the piezoelectric bodies 14A and 14B, a traveling wave excites the elastic body 12 of the ultrasonic motor 10 so that the driving shaft 16 and the rotor 18 are rotated. Further, the vibration of the elastic body 12 is converted by the piezoelectric element 26 to an electric signal and is further inputted, as a feed-back signal, to the microcomputer 32 via the band pass filter 40. Further, a rotational pulse signal corresponding to the rotational speed of the rotor 18 is inputted from the rotation sensor 46' mounted to the ultrasonic motor 10 to the microcomputer 32.

The microcomputer 32 controls the frequency of a driving signal, while monitoring the feed-back signal and the rotational pulse signal, by changing the timing for switching on or off the MOSFETs 90, 92, 94, and 96 so that the frequency of a driving signal gradually approaches to coincide with an optimum driving frequency of the ultrasonic motor 10 and further follow the optimum driving frequency.

The ultrasonic motor 10 is driven in such a manner as described above. However, when the ultrasonic motor 10 is stopped, as shown in FIG. 11, a step-up voltage $V_1$ outputted from the voltage generating circuit 38' is gradually lowered and a driving frequency f of the ultrasonic motor 10 is gradually raised. For this reason, each frequency of an AC voltage $V_2$ outputted from the A-phase amplifier circuit 42 and an AC voltage outputted from the B-phase amplifier circuit 44 gradually becomes higher (the number of revolutions gradually decreases). Accordingly, even if a battery voltage becomes unstable, the amplitude thereof gradually becomes small in a stable manner (in FIG. 11, only the AC voltage $V_2$ outputted from the A-phase amplifier circuit 42 is shown). Meanwhile, the period in time from the time when the voltage generating circuit 38' starts to decrease the step-up voltage $V_1$ to the time when the A-phase amplifier circuit 42 is stopped is about 100 msec.

As described above, even if the voltage supplied from the battery source for a vehicle becomes unstable, the ultrasonic motor 10 is slowly and stably stopped. Accordingly, no audible sound is generated from the ultrasonic motor 10.

Meanwhile, in the present embodiment, the period in time from the time when the voltage generating circuit 38' starts to decrease the step-up voltage $V_1$ to the time when the A-phase amplifier circuit 42 is stopped is about 100 msec. However, the present invention is not limited to the same and the period in time can be varied freely.

Further, in the foregoing, a description was given in which the power source supplied to the voltage generating circuit 38' serves as the battery source for a vehicle and the DC voltage outputted from the voltage generating circuit 38' is set at 100V, and also the AC voltage outputted from each of the A-phase amplifier circuit 42 and the B-phase amplifier circuit 44 is set at 200V. However, the present invention is not limited to the same.

Figure 25:
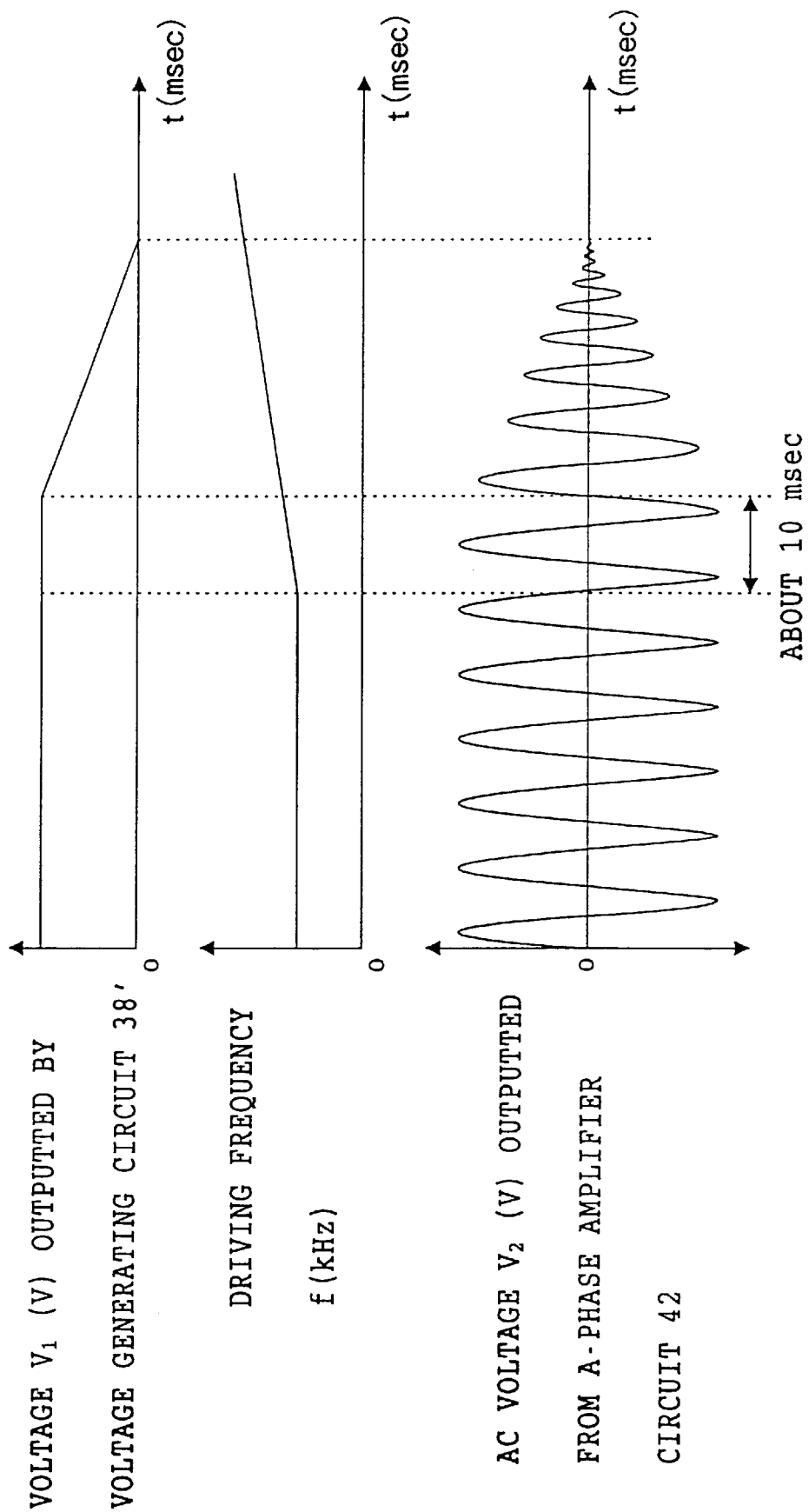
FIG. 25 is a diagram which shows the relationship between a voltage outputted by the voltage generating circuit of the ultrasonic motor driving circuit, a driving frequency of the ultrasonic motor, and an AC voltage outputted by an A-phase amplifier circuit in another example of the second embodiment.

Moreover, in the present embodiment, the step-up voltage $V_1$ outputted from the voltage generating circuit 38' is gradually decreased and the driving frequency f of the ultrasonic motor 10 is gradually increased. Alternatively, the step-up voltage $V_1$ outputted from the voltage generating circuit 38' may be gradually decreased a predetermined time after the driving frequency f starts to be increased. For example, as shown in FIG. 25, the step-up voltage $V_1$ outputted from the voltage generating circuit 38' is gradually decreased about 10 msec after the driving frequency f starts to be increased (the number of revolutions starts to be decreased). As described above, by gradually decreasing the step-up voltage $V_1$ outputted from the voltage generating circuit 38' after the number of revolutions has been decreased in advance, the ultrasonic motor 10 can be gradually stopped more smoothly.

[Third Embodiment]

Next, a third embodiment of the present invention will be described. It should be noted that the same portion as the structure including the ultrasonic motor 10 and the driving circuit 30 in the second embodiment will be denoted by the same reference numerals, and a detailed description thereof will be omitted.

First, the structure of the band pass filter 40 in the third embodiment will be described. The band pass filter 40 is, as shown in FIG. 12, comprised of a detection circuit 50, a filter 52, and a peak hold circuit 54. The detection circuit 50 detects a driving frequency signal of the ultrasonic motor 10 included in a feed-back signal outputted from the piezoelectric element 26 and an audible sound signal included in the feed-back signal.

The filter 52 attenuates the driving frequency signal of the ultrasonic motor 10 and amplifies the audible sound, and further outputs to the peak hold circuit 54. The peak hold circuit 54 holds the maximum value of the amplification level of the audible sound signal and outputs the maximum value to the microcomputer 32.

The microcomputer 32 controls, based on the detected audible sound signal, the number of revolutions of the ultrasonic motor 10 so that the ultrasonic motor 10 smoothly rotates with no audible sound generated therefrom.

Next, an operation of the third embodiment will be described in detail with reference to the drawing. It should be noted that the basic operation of the present embodiment other than the operation of the band pass filter 40 is the same as that of the second embodiment, and a detailed description thereof will be omitted.

When the AC driving signals induced to the secondary coils 100B and 102B of the transformers 100 and 102 are respectively supplied to the piezoelectric bodies 14A and 14B, the elastic body 12 of the ultrasonic motor 10 is excited by a traveling wave and the driving shaft 16 and the rotor 18 are thereby rotated. The vibration of the elastic body 12 is converted by the piezoelectric element 26 to an electric signal and is further inputted, as a feed-back signal, to the detection circuit 50 of the band pass filter 40. The detection circuit 50 detects the driving frequency signal of the ultrasonic motor 10 included in the inputted feed-back signal and the audible sound signal, and further outputs to the filter 52.

The filter 52 attenuates the signal of the driving frequency of the ultrasonic motor 10 and amplifies the audible sound signal, and further outputs to the peak hold circuit 54.

The peak hold circuit 54 holds the maximum value of the amplified audible sound signal and outputs the same to the microcomputer 32.

The microcomputer 32 controls, based on the detected audible sound signal, the number of revolutions of the ultrasonic motor 10 so that the ultrasonic motor 10 can smoothly rotate with no audible sound generated therefrom.

The characteristic of the band pass filter 40 is shown in FIG. 13. As shown in FIG. 13, in a conventional structure in which no filter 52 is provided in the band pass filter 40 (see FIG. 14), each gain of the audible sound signal and the signal of the driving frequency of the ultrasonic motor 10 is substantially identical with each other. On the other hand, in the structure in which the filter 52 is provided in the band pass filter 40 as described in the present invention, a signal in an audible sound band is amplified and the signal of the driving frequency of the ultrasonic motor 10 is attenuated. For this reason, even when the signal of the driving frequency of the ultrasonic motor 10 increases due to disturbance, the audible sound signal is amplified, which allows detection of the audible sound signal. For this reason, it is possible to prevent abnormal sound from being generated from the ultrasonic motor 10 by controlling the number of revolutions of the ultrasonic motor 10 based on the detected audible sound signal and also possible to drive smoothly the ultrasonic motor 10.

Meanwhile, in the present embodiment, the audible sound signal is amplified and the driving frequency signal of the ultrasonic motor 10 is attenuated. However, the present invention is not limited to the same. For example, only the audible sound signal may be amplified with the driving frequency signal of the ultrasonic motor 10 remaining unchanged, or only the driving frequency signal of the ultrasonic motor 10 may be attenuated with the audible sound signal remaining unchanged.

[Fourth Embodiment]

Next, a fourth embodiment of the present invention will be described. It should be noted that the structure including the ultrasonic motor 10 and the driving circuit 30 in the fourth embodiment is the same as that of the second embodiment, and a detailed description thereof will be omitted. Further, in the fourth embodiment, there will be described a case in which the ultrasonic motor 10 is applied to, for example, a so-called tilt mechanism of a steering device of an automobile, a telescopic mechanism, and the like.

When the ultrasonic motor 10 is applied to a tilt mechanism of a steering device of an automobile, a telescopic mechanism, and the like, the ultrasonic motor 10 operates due to electric power being supplied thereto from a battery source for a vehicle (for example, 12V). FIG. 15 schematically shows the principal portion of the steering device of an automobile.

A steering device 90 includes a steering gear box (not shown) for steering to roll wheels (not shown) and one end of a steering shaft 94 is connected to the steering gear box.

The other end of the steering shaft 94 is connected to a steering wheel 92. Further, a portion of the steering shaft 94 is covered by a steering column 96. Provided within the steering column 96 are the above-described tilt mechanism (not shown) for moving the steering wheel 92 in the vertical direction and the above-described telescopic mechanism (not shown) for moving the steering wheel 92 in the axial direction of the steering shaft 94.

The above-described tilt mechanism or telescopic mechanism uses the driving force of the ultrasonic motor 10 so as to allow movement of the steering wheel 92 in the vertical direction or in the axial direction of the steering shaft 94 based on the operation of an operator.

Further, when the position of the steering wheel 92 is stored and a key is pulled out, the steering wheel 92 is moved to a lock position, and when the key is inserted in, the steering wheel 92 can also be moved to the stored position.

When the steering wheel 92 is moved to the lock position as described above, the steering wheel 92 is locked, and therefore, a load to be applied to the ultrasonic motor increases and the number of revolutions of the ultrasonic motor thereby decreases.

Figure 18:
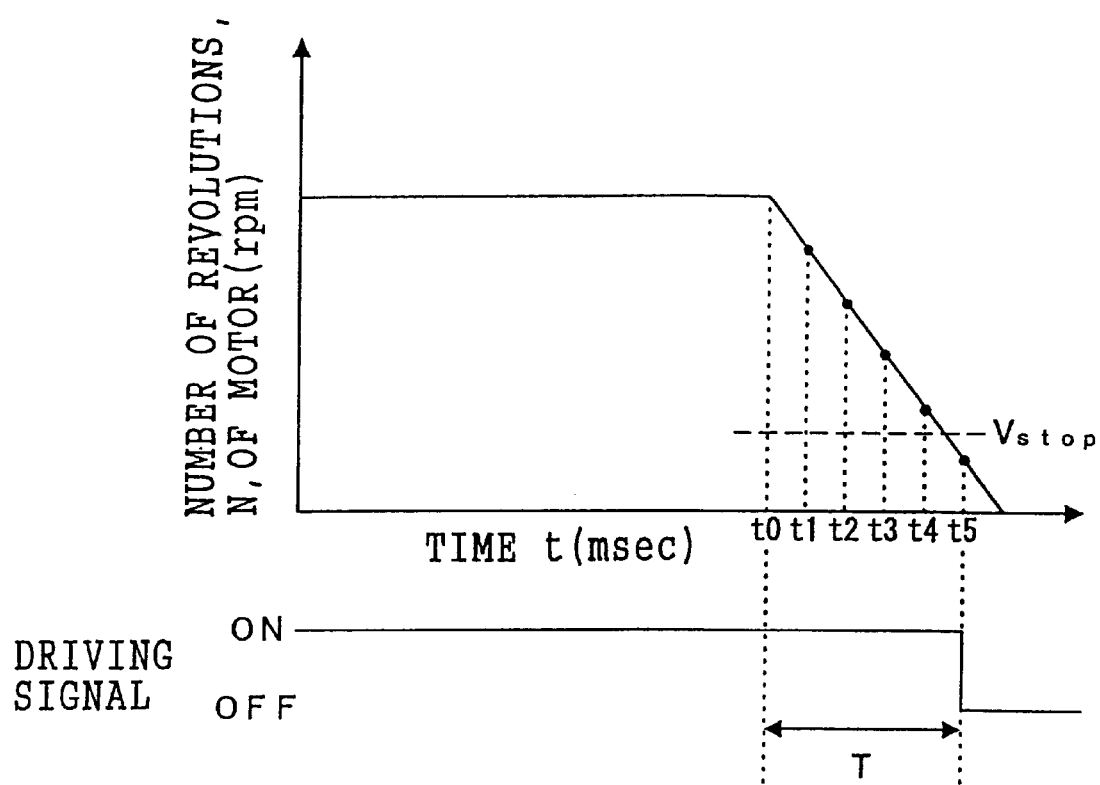
FIG. 18 is a diagram which shows variations, with the passage of time, of a driving signal and the number of revolutions of a conventional ultrasonic motor.

Conventionally, as shown in FIG. 18, when the number of revolutions comes to a predetermined number of revolutions $V_{stop}$ or less, it is determined that the steering wheel 92 has moved to the lock position, and control is made so as to stop driving of the ultrasonic motor. Further, when the motor comes to the predetermined number of revolutions or less due to other factors, the predetermined number of revolutions $V_{stop}$ is set at a rather low value so as to prevent driving of the ultrasonic motor from being mistakenly stopped.

Next, an operation of the fourth embodiment will be described in detail with reference to the related drawings. It should be noted that the basic operation of the fourth embodiment other than that at the time of stopping of driving the ultrasonic motor 10 is the same as that of the second embodiment, and a detailed description thereof will be omitted.

When the steering wheel 92 has moved to be locked at the lock position, the number of revolutions of the ultrasonic motor 10 gradually decreases. The microcomputer 32 calculates the number of revolutions at intervals of a predetermined time (for example, 10 msec). In a case in which the calculated number of revolutions $V_s$ is lower than a predetermined number of revolutions $V_1$, when a previously-calculated number of revolutions $V_{sold}$ is a predetermined number of revolutions $V_2$ or greater, or when the calculated number of revolutions $V_s$ is the predetermined number of revolutions $V_{stop}$ or less, the driving signal is turned off to stop driving of the ultrasonic motor.

Figure 16:
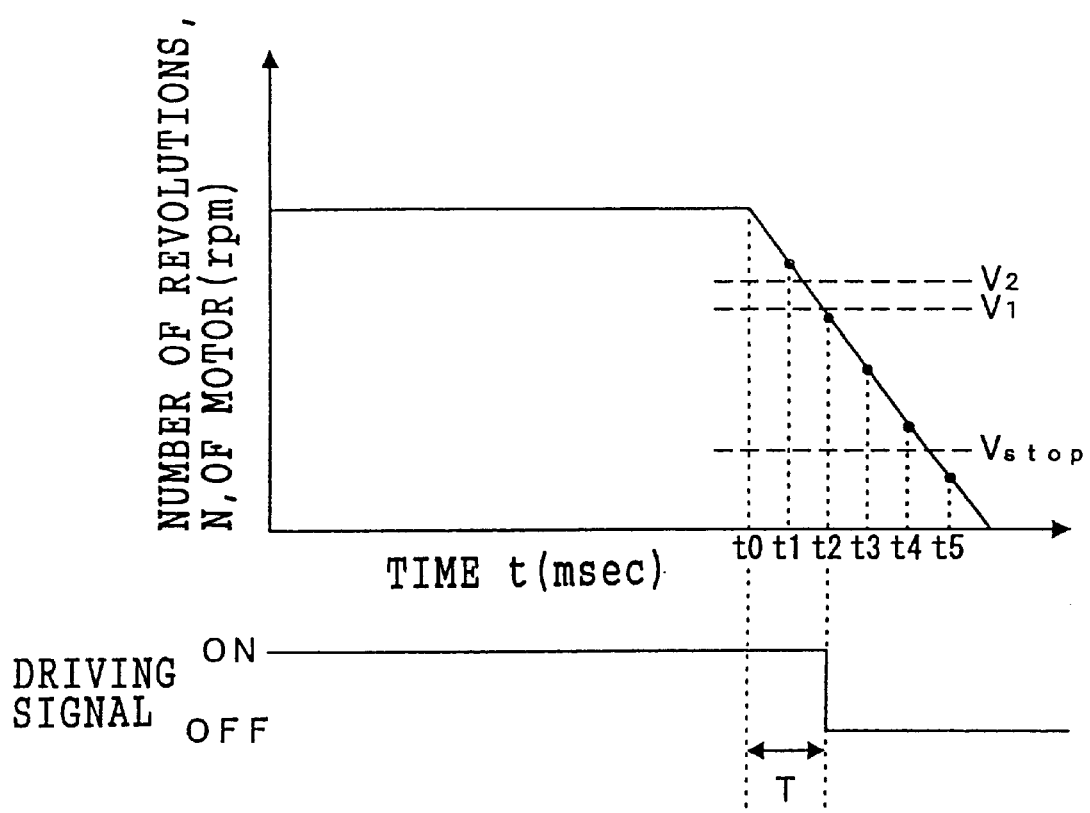
FIG. 16 is a diagram which shows variations, with the passage of time, of a driving signal and of the number of revolutions of an ultrasonic motor according to the fourth embodiment.

FIG. 16 shows variations, with the passage of time, of the driving signal outputted by the microcomputer and the number of revolutions of the ultrasonic motor. First, when the steering wheel 92 is moved to be locked at the lock position at t0, the number of revolutions of the ultrasonic motor 10 gradually decreases. The calculated number of revolutions $V_s$ is a predetermined number of revolutions $V_1$ or greater at t1, and therefore, the driving signal remains on. Subsequently, the number of revolutions $V_s$ calculated at t2 is the predetermined number of revolutions $V_1$ or less and the number of revolutions $V_{sold}$ calculated at t1 is the predetermined number of revolutions $V_2$ or greater, and therefore, the driving signal is turned off to stop driving of the ultrasonic motor. Further, even when the above-described conditions are not satisfied, at the predetermined number of revolutions $V_{stop}$ or less, the driving signal is turned off to stop driving of the ultrasonic motor.

Figure 17:
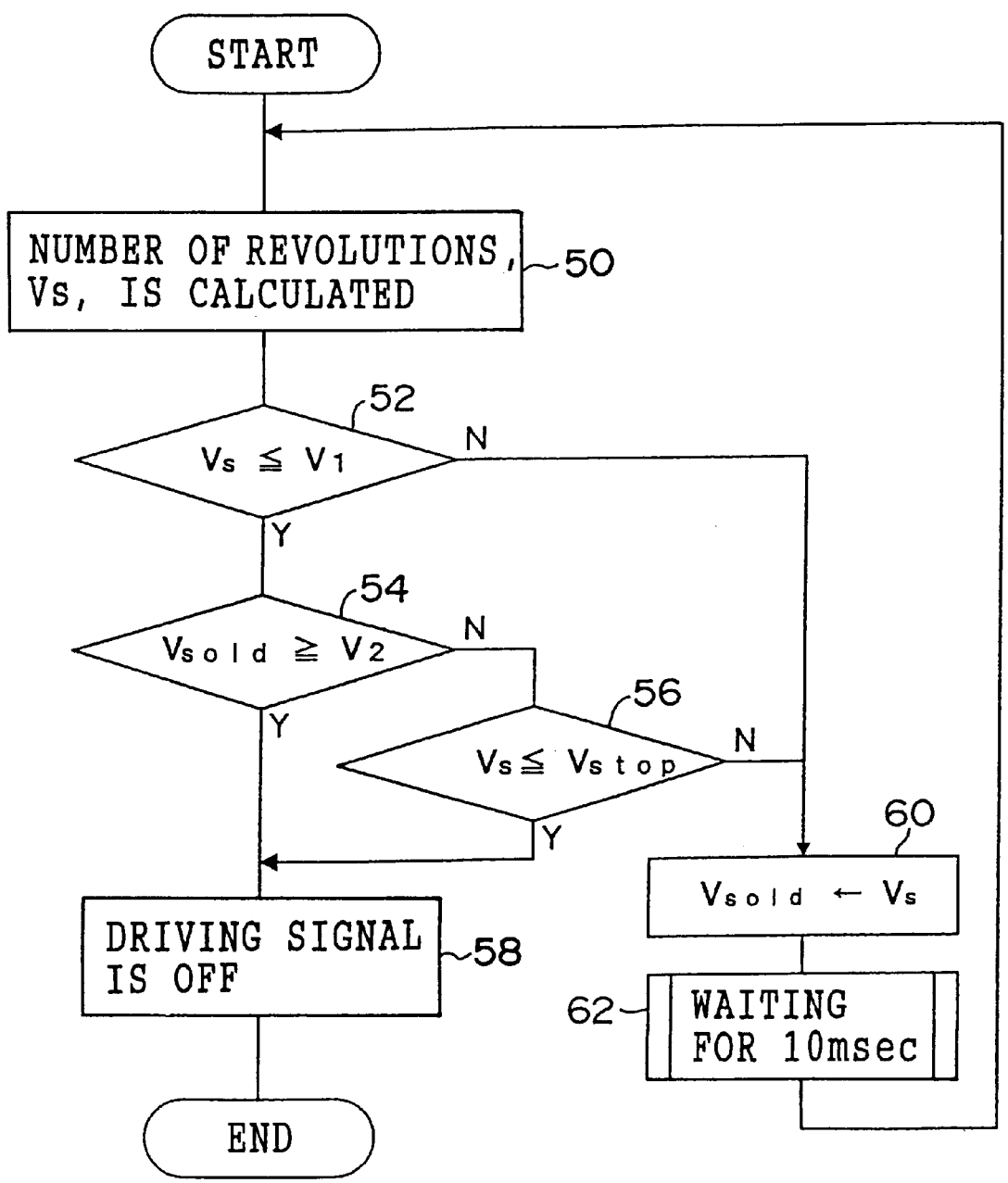
FIG. 17 is a flow chart which shows an operation of a control program which executes stop control of the ultrasonic motor according to the fourth embodiment.

The operation of a control program for the above-described control will be hereinafter described with reference to a flow chart shown in FIG. 17.

First, in step 50, the number of revolutions $V_s$ is calculated based on the rotational pulse signal outputted from the rotation sensor 46'. In the subsequent step 52, it is determined whether $V_s$ is $V_1$ and less. When the decision of step 52 is yes, the process proceeds to step 54, and when the decision of step 52 is no, the process proceeds to step 60. In step 54, it is determined whether the previously calculated number of revolutions $V_{sold}$ is $V_2$ and more. When the decision of step 54 is no, the process proceeds to step 56. When the decision of step 54 is yes, in step 58, the driving signal is turned off to stop driving of the ultrasonic motor 10.

In step 56, it is determined whether $V_s$ is $V_{stop}$ and less. When the decision of step 56 is yes, the process proceeds to step 58, and when the decision of step 56 is no, the process proceeds to step 60. In step 60, $V_{sold}$ is substituted by $V_s$ and the process proceeds to step 62, in which the process is placed in a waiting state for 10 msec, and the process returns to step 50.

As described above, in the case in which the ultrasonic motor 10 is stopped with the steering wheel 92 being locked at the lock position, when the conditions that $V_s$ is $V_1$ and less and $V_{sold}$ is $V_2$ and more are satisfied, namely, when the rate of change in the number of revolutions is large, it is determined that the steering wheel 92 has been locked at the lock position, and driving of the ultrasonic motor 10 is stopped. For this reason, as shown in FIG. 16, the period in time T from the time when the steering wheel 92 is locked at the lock position to the time of stoppage of the ultrasonic motor 10 is reduced as compared with the conventional structure shown in FIG. 18. As a result, generation of an audible sound can be prevented. Further, even when $V_s$ is $V_{stop}$ and less, the ultrasonic motor 10 is stopped, which makes it possible to reliably stop the ultrasonic motor 10.

Further, with the values $V_1$ and $V_2$ being varied in the range of $V_{stop} < V_1 < V_2$ depending on the existing state of things, a stopping condition of the ultrasonic motor corresponding to the existing state of things can be set.

In the present embodiment, the number of revolutions is calculated at intervals of 10 msec. However, the present invention is not limited to the same, and the number of revolutions can be set arbitrarily.

[Fifth Embodiment]

Next, a fifth embodiment of the present invention will be described. It should be noted that the structure including the ultrasonic motor 10 and the driving circuit 30 in the fifth embodiment is the same as that of the second embodiment, and a detailed description thereof will be omitted.

An operation of the fifth embodiment will be hereinafter described in detail with reference to the attached drawing. It should be noted that the basic operation of the fifth embodiment other than the operation of the ultrasonic motor 10 from the start time of driving to the time of normal driving is the same as that of the second embodiment, and a detailed description thereof will be omitted.

When the ultrasonic motor 10 is driven, a speed indicating value (driving frequency signal) is outputted from the microcomputer 32 to the oscillator circuit 34. The oscillator circuit 34 starts oscillating at a driving frequency corresponding to the speed indicating value outputted from the microcomputer 32.

Figure 19:
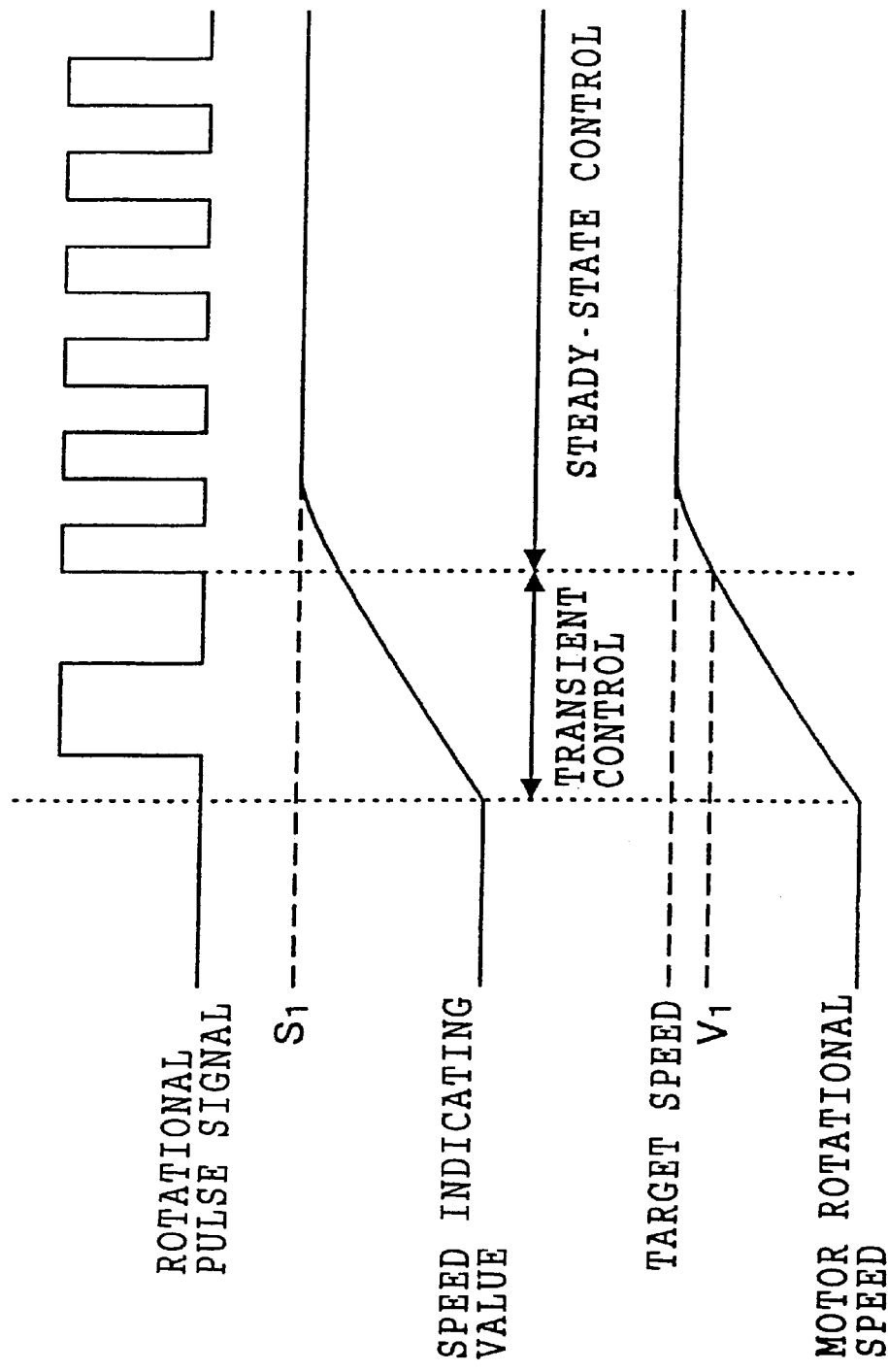
FIG. 19 is a diagram which shows variations, with the passage of time, of a rotational pulse signal outputted from a rotation sensor of an ultrasonic motor, a speed indicating value outputted from a microcomputer, and a rotational speed of the ultrasonic motor according to a fifth embodiment of the present invention.

The microcomputer 32 executes, as shown in FIG. 19, transient control in which the speed indicating value is gradually increased (the driving frequency is gradually decreased) and the rotational speed of the ultrasonic motor 10 is gradually increased, and further calculates the rotational speed based on the rotational pulse signal outputted from the rotation sensor 46'. When the rotational speed comes to a predetermined threshold value $V_1$ set at a value slightly lower than a target rotational speed, the above-described transient control is changed to steady-state control, and based on the rotational pulse signal, the rotational speed is controlled so as to become the target rotational speed. Meanwhile, the wider the pulse width of the rotational pulse signal, the slower the rotational speed becomes, and the narrower the pulse width, the higher the rotational speed becomes.

Figure 20:
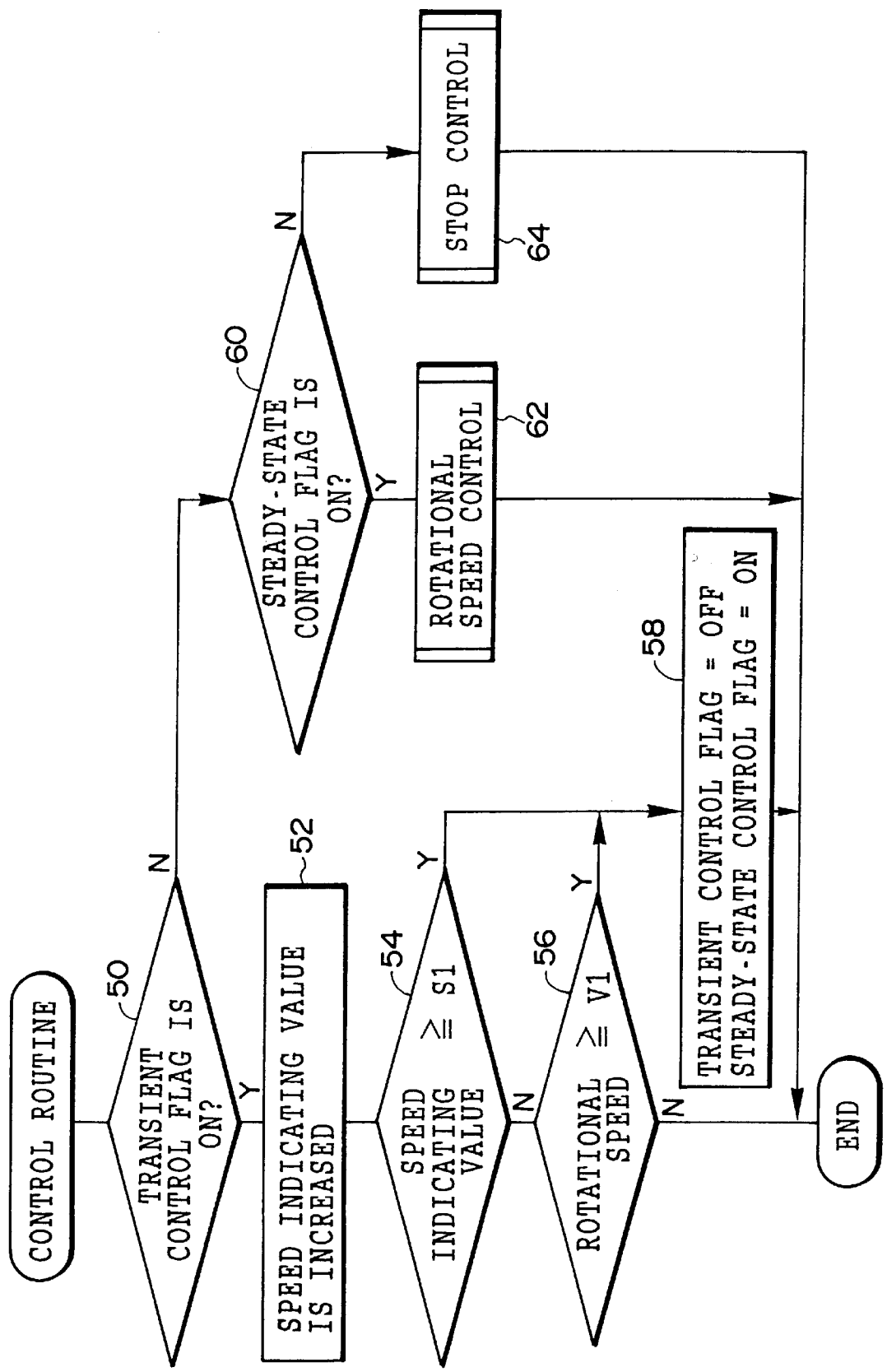
FIG. 20 is a flow chart which shows an operation of a control program according to the fifth embodiment.

A control routine which executes the above-described operation will be described hereinafter with reference to a flow chart shown in FIG. 20.

First, in step 50, it is determined whether a transient control flag is in an on state. When the decision of step 50 is yes, the process proceeds to step 52, and when the decision of step 50 is no, the process proceeds to step 60. At the start time of driving the ultrasonic motor 10, the transient control flag is previously set in the on state. In step 52, the speed indicating value is increased. As a result, the driving frequency is lowered, and therefore, the rotational speed of the ultrasonic motor 10 increases.

Subsequently, in step 54, it is determined whether the speed indicating value is a speed indicating value $S_1$, which corresponds to the target rotating speed, and greater. When the decision of step 54 is yes, the process proceeds to step 58, and when the decision of step 54 is no, the process proceeds to step 56. In step 56, it is determined whether the rotational speed is a predetermined threshold value $V_1$ and greater. When the decision of step 56 is no, the process returns, and when the decision of step 56 is yes, the process proceeds to step 58. In step 58, the transient control flag is set in an off state and the steady-state control flag is set in an on state, and the process returns.

In step 60, it is determined whether the steady-state control flag is set in an on state, and when the decision of step 60 is yes, in step 62, control of rotational speed is effected so that the rotational speed becomes a predetermined rotational speed, and the process returns. When the decision of step 60 is no, in step 64, stop control is effected and the process returns.

Figure 21:
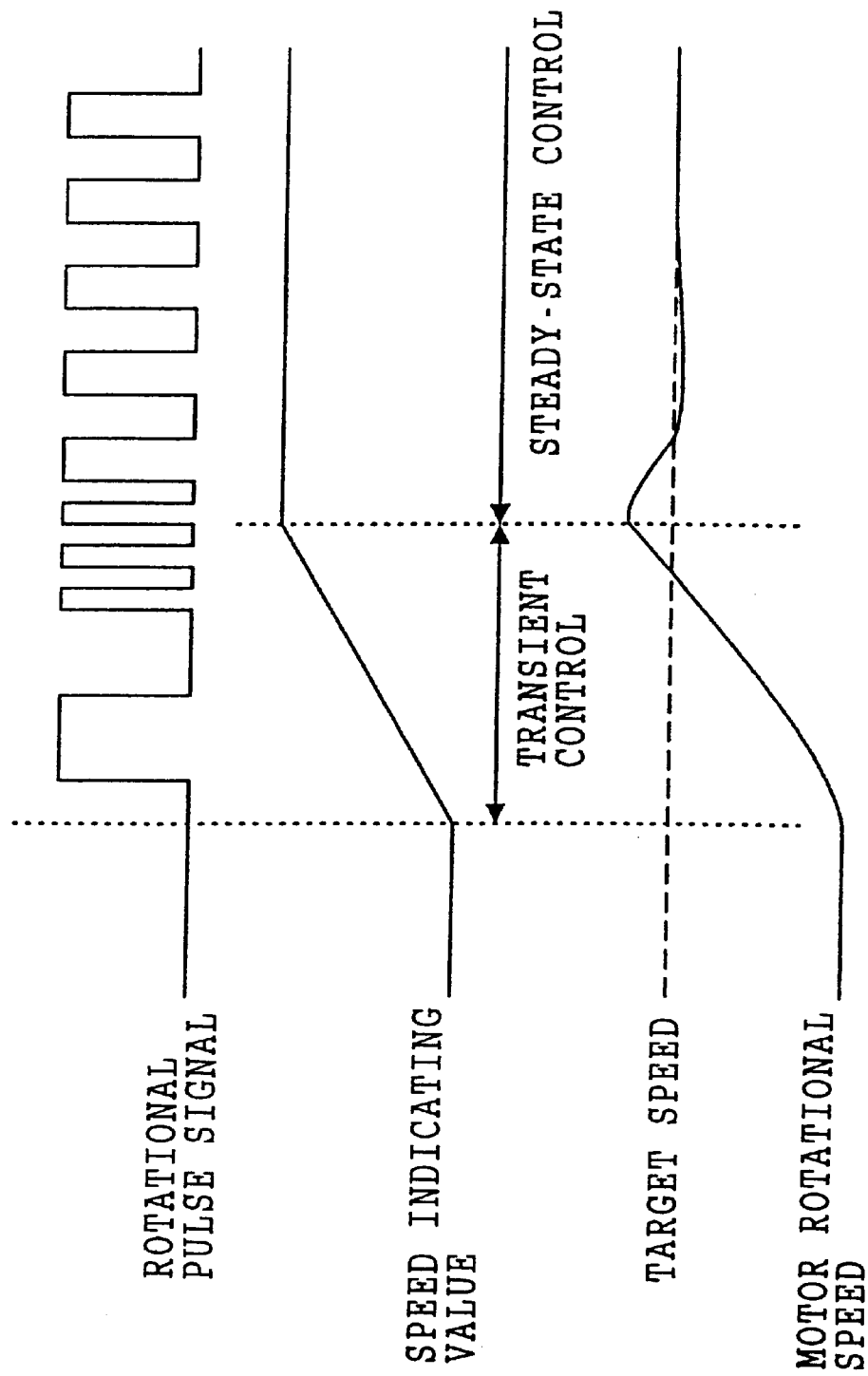
FIG. 21 is a diagram which shows variations, with the passage of time, of a rotational pulse signal outputted from a rotation sensor of an ultrasonic motor, a speed indicating value outputted from a microcomputer, and a rotational speed of the ultrasonic motor in a conventional method.

As described above, at the start time of driving the ultrasonic motor 10, the transient control in which the speed indicating value is increased to gradually increase the rotational speed is effected. However, when the rotational speed has come to a rotational speed which is slightly lower than the target rotational speed, the operation is changed to the steady-state control so that the rotational speed is controlled so as to become the target rotational speed. For this reason, as shown in FIG. 19, unlike a conventional case (see FIG. 21), there is no possibility that the rotational speed of the ultrasonic motor comes to the target rotational speed or higher due to the difference between the timing at which the rotational speed of the ultrasonic motor comes to a predetermined rotational speed and the timing at which it is determined by the microcomputer that the rotational speed of the ultrasonic motor comes to a predetermined rotational speed. Accordingly, no generation of an audible sound occurs.

[Sixth Embodiment]

Next, a sixth embodiment of the present invention will be described. It should be noted that the structure including the ultrasonic motor 10 and the driving circuit 30 in the sixth embodiment is the same as that of the second embodiment, and a detailed description thereof will be omitted.

An operation of the sixth embodiment will be hereinafter described in detail with reference to the attached drawing. Meanwhile, the basic operation of the sixth embodiment other than the control of the driving frequency of the ultrasonic motor 10 is the same as that of the second embodiment, and a detailed description thereof will be omitted. Further, in the sixth embodiment, there was described a case in which the ultrasonic motor 10 is applied to a tilt mechanism which moves the steering wheel 92 of the steering device 90 of an automobile shown in FIG. 15 in the vertical direction. Moreover, the longest driving time operated by an operator is set at about one second.

The microcomputer 32 controls the frequency of a driving signal, while monitoring the feed-back signal and the rotational pulse signal, by changing the timing for switching on or off the MOSFETs 90, 92, 94, and 96 so that the frequency of a driving signal gradually approaches to coincide with an optimum driving frequency of the ultrasonic motor 10 and further follow the optimum driving frequency.

Figure 22:
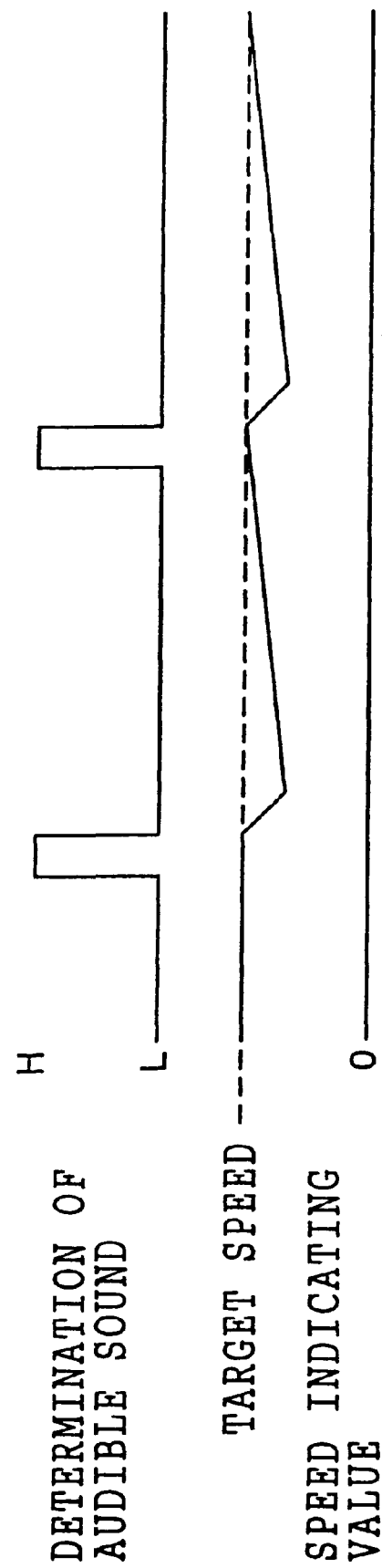
FIG. 22 is a diagram which shows determination of an audible sound in a microcomputer and variation of a speed indicating value outputted by the microcomputer, with the passage of time, according to a sixth embodiment of the present invention.

At this time, as shown in FIG. 22, when the audible sound signal is detected from the feed-back signal and it is determined by the microcomputer 32 that an audible sound is turned on (becomes high level), the microcomputer 32 decreases the speed indicating value so that the driving frequency increases at a predetermined increasing speed (for example, 100 Hz/msec).

For example, after about 10 msec has elapsed (the driving frequency increases by about 1 kHz), the microcomputer 32 increases the speed indicating value so that the driving frequency is lowered at a predetermined lowering speed (for example, 1 Hz/msec). Namely, the ratio between the lowering speed and the increasing speed of the driving frequency is set at 1:100. Then, for example, when after about one second has elapsed, the audible sound signal is detected again from the feed-back signal, the driving frequency is increased again. Subsequently, the above-described operation is repeated.

For this reason, the audible sound signal is detected every about one second. However, as described above, the longest driving time of the ultrasonic motor 10 operated by the tilt mechanism of the steering device 90 is about one second, and therefore, there is no possibility that the audible sound signal be detected again after the audible sound signal has been detected once.

When the audible sound signal is thus detected from the feed-back signal, the driving frequency is increased quickly, and thereafter, the driving frequency is lowered slowly, which allows each interval of detection of the audible sound signal to be lengthened.

Meanwhile, in the present embodiment, the speed ratio between the lowering speed of the driving frequency and the increasing speed of the driving frequency is set at 1:100.

However, the present invention is not limited to the same and the speed ratio can be set freely. Alternatively, the speed ratio may also be arbitrarily varied depending on the position of the steering wheel 92.

Figure 23:
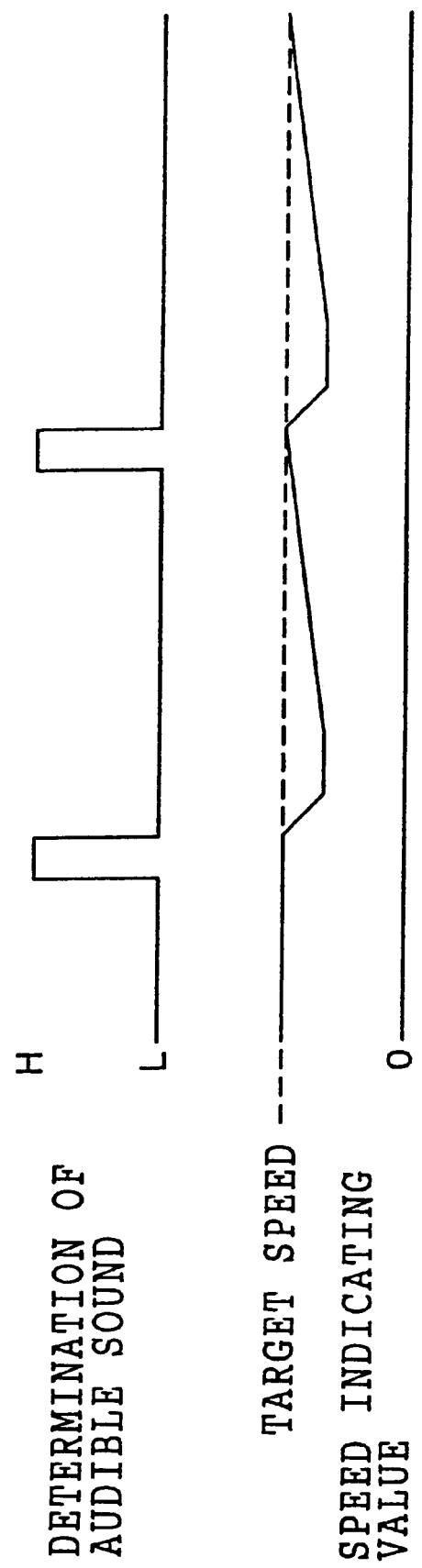
FIG. 23 is a diagram which shows determination of an audible sound in a microcomputer and variation of a speed indicating value outputted by the microcomputer, with the passage of time, in another example of the sixth embodiment.

As shown in FIG. 23, the driving frequency is made fixedly for a predetermined time after the audible sound signal is detected and the driving frequency is increased, the driving frequency may also be lowered subsequently.

Figure 24:
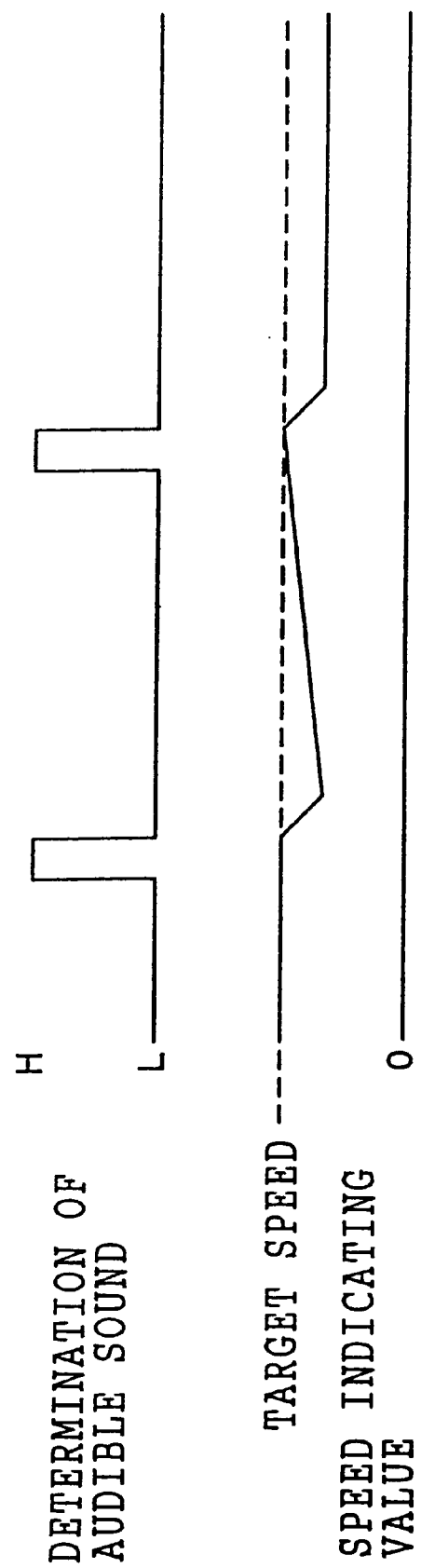
FIG. 24 is a diagram which shows determination of an audible sound in a microcomputer and variation of a speed indicating value outputted by the microcomputer, with the passage of time, in still another example of the sixth embodiment.

Further, as shown in FIG. 24, when ascending and descending of the driving frequency is effected at least once and the driving frequency ascends again due to detection of the audible sound signal, the subsequent driving frequency may also be controlled so as to become fixed.

What is claimed is:

1. A driving circuit of an ultrasonic motor in which a driving force is obtained due to a predetermined AC voltage corresponding to a predetermined driving frequency being applied thereto, comprising:

voltage increasing means which increases a voltage to the predetermined AC voltage in a first predetermined time from the start time of driving the ultrasonic motor;

frequency lowering means which lowers a frequency to the predetermined driving frequency in a second predetermined time from the start time of driving the ultrasonic motor; and a computer electrically connected to the voltage increasing means and the frequency lowering means and supplying a control input to at least one of the voltage increasing means and the frequency lowering means.

2. A driving circuit of an ultrasonic motor according to claim 1, wherein, at the start time of driving the ultrasonic motor, the operation of said frequency lowering means is started after the AC voltage has been increased to the predetermined AC voltage by said voltage increasing means.

3. A driving circuit of an ultrasonic motor according to claim 1, wherein, at the start time of driving the ultrasonic motor, the operation of said frequency lowering means is started before the AC voltage has been increased to the predetermined AC voltage by said voltage increasing means.

4. A driving circuit of an ultrasonic motor according to claim 1, wherein said voltage increasing means includes a voltage control circuit and a driving signal generating circuit; and said voltage control circuit has a power source and a duty control circuit and outputs a DC voltage, and said driving signal generating circuit has two amplifier circuits and converts the DC voltage to an AC voltage and also outputs the AC voltage, one of the two amplifier circuits being provided to generate a sine-wave signal and the other one being provided to generate a sine-wave signal whose phase is different from that of the sine-wave signal generated by the one amplifier circuit by 90 degrees.

5. A driving circuit of an ultrasonic motor according to claim 4, wherein the DC voltage outputted by said voltage control circuit is increased in a predetermined time.

6. A driving circuit of an ultrasonic motor according to claim 4, wherein a DC voltage to be supplied by the power source to said voltage control circuit is increased in a predetermined time.

7. A driving circuit of an ultrasonic motor according to claim 4, wherein the DC voltage outputted by said voltage control circuit is constant and the AC voltage outputted by said driving signal generating circuit is increased in a predetermined time.

8. A driving circuit of an ultrasonic motor in which a driving force is obtained due to a predetermined AC voltage corresponding to a predetermined driving frequency being applied thereto, comprising:

voltage increasing means which continuously or stepwise increases a voltage to the predetermined AC voltage in a first predetermined time from the start time of driving the ultrasonic motor;

frequency lowering means which continuously or stepwise lowers a frequency to the predetermined driving frequency in a second predetermined time from the start time of driving the ultrasonic motor; and control electronics electrically connected to the voltage increasing means and the frequency lowering means and supplying a control input to at least one of the voltage increasing means and the frequency lowering means.

9. A driving circuit of an ultrasonic motor according to claim 8, wherein, at the start time of driving the ultrasonic motor, the operation of said frequency lowering means is started after the AC voltage has been increased to the predetermined AC voltage by said voltage increasing means.

10. A driving circuit of an ultrasonic motor according to claim 8, wherein, at the start time of driving the ultrasonic motor, the operation of said frequency lowering means is started before the AC voltage has been increased to the predetermined AC voltage by said voltage increasing means.

11. A driving circuit of an ultrasonic motor according to claim 8, wherein said voltage increasing means includes a voltage control circuit and a driving signal generating circuit; and said voltage control circuit has a power source and a duty control circuit and outputs a DC voltage, and said driving signal generating circuit has two amplifier circuits and converts the DC voltage to an AC voltage and also outputs the AC voltage, one of the two amplifier circuits being provided to generate a sine-wave signal and the other one being provided to generate a sine-wave signal whose phase is different from that of the sine-wave signal generated by the one amplifier circuit by 90 degrees.

12. A driving circuit of an ultrasonic motor according to claim 11, wherein the DC voltage outputted by said voltage control circuit is increased in a predetermined time.

13. A driving circuit of an ultrasonic motor according to claim 11, wherein a DC voltage to be supplied by the power source to said voltage control circuit is increased in a predetermined time.

14. A driving circuit of an ultrasonic motor according to claim 11, wherein the DC voltage outputted by said voltage control circuit is constant and the AC voltage outputted by said driving signal generating circuit is increased in a predetermined time.

15. A driving circuit of an ultrasonic motor in which a DC voltage supplied from a predetermined power source is transformed and converted to an AC voltage corresponding to a predetermined driving frequency, and a driving force is obtained from the AC voltage, comprising:

voltage decreasing means which, at the time of stoppage of the operation of the ultrasonic motor, decreases the AC voltage in a first predetermined time;

frequency raising means which, at the time of stoppage of the operation of the ultrasonic motor, raises the driving frequency in a second predetermined time; and control electronics electrically connected to the voltage decreasing means and the frequency raising means and supplying a control input to at least one of the voltage increasing means and the frequency lowering means.

16. A driving circuit of an ultrasonic motor according to claim 15, wherein said voltage decreasing means includes a voltage generating circuit and a driving signal generating circuit; and wherein said voltage generating circuit is connected to said predetermined power source and has a duty control circuit and outputs a DC voltage, and said driving signal generating circuit has two amplifier circuits being provided to generate a sine-wave signal and the other one being provided to generate a sine-wave signal whose phase is different from that of the sine-wave signal generated by the one amplifier circuit by 90 degrees.

17. A driving circuit of an ultrasonic motor in which a DC voltage supplied from a predetermined power source is transformed and converted to an AC voltage corresponding to a predetermined driving frequency, and a driving force is obtained from the AC voltage, comprising:

voltage decreasing means which, at the time of stoppage of the operation of the ultrasonic motor, continuously or stepwise decreases the AC voltage in a predetermined time;

frequency raising means which gradually raises the driving frequency synchronously with the decrease of voltage by said voltage decreasing means; and a computer electrically connected to the voltage decreasing means and the frequency raising means and supplying a control input to at least one of the voltage increasing means and the frequency lowering means.

18. A driving circuit of an ultrasonic motor according to claim 17, wherein said voltage decreasing means includes a voltage generating circuit and a driving signal generating circuit; and wherein said voltage generating circuit is connected to said predetermined power source and has a duty control circuit and outputs a DC voltage, and said driving signal generating circuit has two amplifier circuits being provided to generate a sine-wave signal and the other one being provided to generate a sine-wave signal whose phase is different from that of the sine-wave signal generated by the one amplifier circuit by 90 degrees.

* * * * *